(12) United States Patent
Beachy et al.

(10) Patent No.: US 8,375,541 B1
(45) Date of Patent: Feb. 19, 2013

(54) TOOL SYSTEM

(76) Inventors: Robert Wisler Beachy, Crozet, VA (US); Jay Jeffrey Kakuk, Plymouth, MN (US); Robert Lawrence Buckley, Eden Prairie, MN (US)

( * ) Notice: Subject to any disclaimer, the term of this patent is extended or adjusted under 35 U.S.C. 154(b) by 1432 days.

(21) Appl. No.: 11/807,129

(22) Filed: May 24, 2007

Related U.S. Application Data

(60) Provisional application No. 60/802,987, filed on May 24, 2006.

(51) Int. Cl.
*B23B 45/14* (2006.01)

(52) U.S. Cl. ........ 29/26 A; 408/16; 408/110; 408/115 R

(58) Field of Classification Search ................. 29/26 A; 408/110, 115 R; *B23B 45/14*
See application file for complete search history.

(56) References Cited

U.S. PATENT DOCUMENTS

| | | | |
|---|---|---|---|
| 534,830 A | 2/1895 | Hoge | |
| 2,483,060 A | 9/1949 | Niedelman | |
| 2,622,457 A * | 12/1952 | Buck | 408/76 |
| 2,837,939 A | 6/1958 | Leitner | |
| 2,849,900 A | 9/1958 | Heidtman | |
| 2,887,910 A * | 5/1959 | Williamson, Jr. | 408/111 |
| 2,891,428 A | 6/1959 | Donee | |
| 2,909,085 A | 10/1959 | Jepson | |
| 2,925,001 A * | 2/1960 | Johnson | 408/99 |
| 2,938,411 A * | 5/1960 | Herfurth | 408/76 |
| 2,953,045 A * | 9/1960 | Carles | 408/110 |
| 3,007,686 A * | 11/1961 | Pearson | 173/33 |
| 3,046,817 A | 7/1962 | Schwabte | |
| 3,077,129 A | 2/1963 | Caries | |
| 3,100,408 A * | 8/1963 | Pufahl | 408/110 |
| 3,107,556 A | 10/1963 | Pugsley | |
| 3,119,286 A | 1/1964 | Forman | |
| 3,141,360 A | 7/1964 | Wolf | |
| 3,534,639 A | 10/1970 | Treichler | |
| 3,708,238 A | 1/1973 | Kissane | |
| 3,746,460 A | 7/1973 | Lipe | |
| 3,827,822 A | 8/1974 | Converse | |
| 3,833,313 A | 9/1974 | Gallion | |
| 3,853,420 A | 12/1974 | Abell | |
| 3,864,053 A | 2/1975 | Harwood | |
| 3,874,810 A | 4/1975 | Russell | |
| 3,890,058 A | 6/1975 | Self | |
| 3,958,893 A | 5/1976 | Boyajian | |
| 3,979,165 A | 9/1976 | Pyle | |
| 4,072,440 A | 2/1978 | Glover | |
| 4,080,092 A | 3/1978 | Hudson | |
| 4,082,474 A | 4/1978 | Stiger | |
| 4,132,496 A | 1/1979 | Casto | |

(Continued)

FOREIGN PATENT DOCUMENTS

DE 2542679 A * 3/1977

*Primary Examiner* — Eric A Gates

(57) ABSTRACT

One embodiment of the present invention is a drill motor assembly (100) including a drill motor (102) and a housing guide assembly (104). The housing guide assembly in turn includes a base (106) and a mast (108) pivotally and adjustably attached thereto. A male slide (110) on the mast (108) slidably and precisely engages a female slide (112) on the drill motor (102). To drill a precise hole using the drill motor assembly (100), the operator simply adjusts the mast (108) to the desired angle relative to the base (106), engages the slides (110) and (112), activates the drill motor (102), and moves the drill motor (102) along the mast (108) until the drilling operation is completed. The present invention also includes a wide variety of accessories that can be connected to, and in some cases powered by, the drill motor (102); and a wide variety of storage options as well; and all of the attachments and storage options use the slides on the tool and accessories to facilitate use and/or storage of the various devices and components of the present invention.

1 Claim, 44 Drawing Sheets

U.S. PATENT DOCUMENTS

| | | |
|---|---|---|
| 4,179,231 A | 12/1979 | Hadden |
| 4,242,016 A | 12/1980 | Faris |
| 4,253,784 A | 3/1981 | Anderson |
| 4,279,552 A | 7/1981 | Epstein |
| 4,281,949 A | 8/1981 | Bugarin |
| 4,314,782 A | 2/1982 | Beekenkamp |
| D264,930 S | 6/1982 | Lindsay |
| 4,349,301 A | 9/1982 | Boyajian |
| 4,389,790 A | 6/1983 | Dunlap |
| 4,391,558 A | 7/1983 | Perry |
| 4,572,715 A * | 2/1986 | Wolff .......................... 409/180 |
| D291,528 S | 8/1987 | Degen |
| 4,729,698 A | 3/1988 | Haddon |
| 4,765,786 A | 8/1988 | Krogh |
| 4,810,137 A * | 3/1989 | Yang .......................... 408/100 |
| 4,836,720 A | 6/1989 | Hadden |
| 4,923,341 A | 5/1990 | Cameron |
| 5,006,022 A | 4/1991 | Miller |
| 5,052,112 A | 10/1991 | MacDonald |
| 5,147,162 A | 9/1992 | Capotosto et al. |
| 5,150,993 A | 9/1992 | Miller |
| 5,165,827 A | 11/1992 | Miller |
| 5,246,197 A | 9/1993 | MacDonald |
| 5,361,504 A | 11/1994 | Huang |
| 5,667,345 A | 9/1997 | Wiklund |
| 5,690,451 A | 11/1997 | Thurler et al. |
| 5,797,708 A | 8/1998 | Bencic |
| 6,050,753 A | 4/2000 | Turner |
| 6,247,879 B1 | 6/2001 | Costa |
| 6,375,395 B1 | 4/2002 | Heintzeman |
| 6,386,802 B1 | 5/2002 | Negri |
| D474,093 S | 5/2003 | Chang |
| 6,587,184 B2 | 7/2003 | Wursch et al. |
| 6,692,201 B2 | 2/2004 | Soderman |
| 6,860,682 B1 | 3/2005 | Le Picq |
| 7,967,534 B2 * | 6/2011 | McDaniel et al. ........ 408/115 R |
| 7,976,252 B2 * | 7/2011 | McDaniel et al. ........ 408/115 R |
| 2005/0152756 A1 * | 7/2005 | Howard ........................ 408/103 |
| 2005/0200087 A1 * | 9/2005 | Vasudeva et al. ............. 279/143 |

* cited by examiner

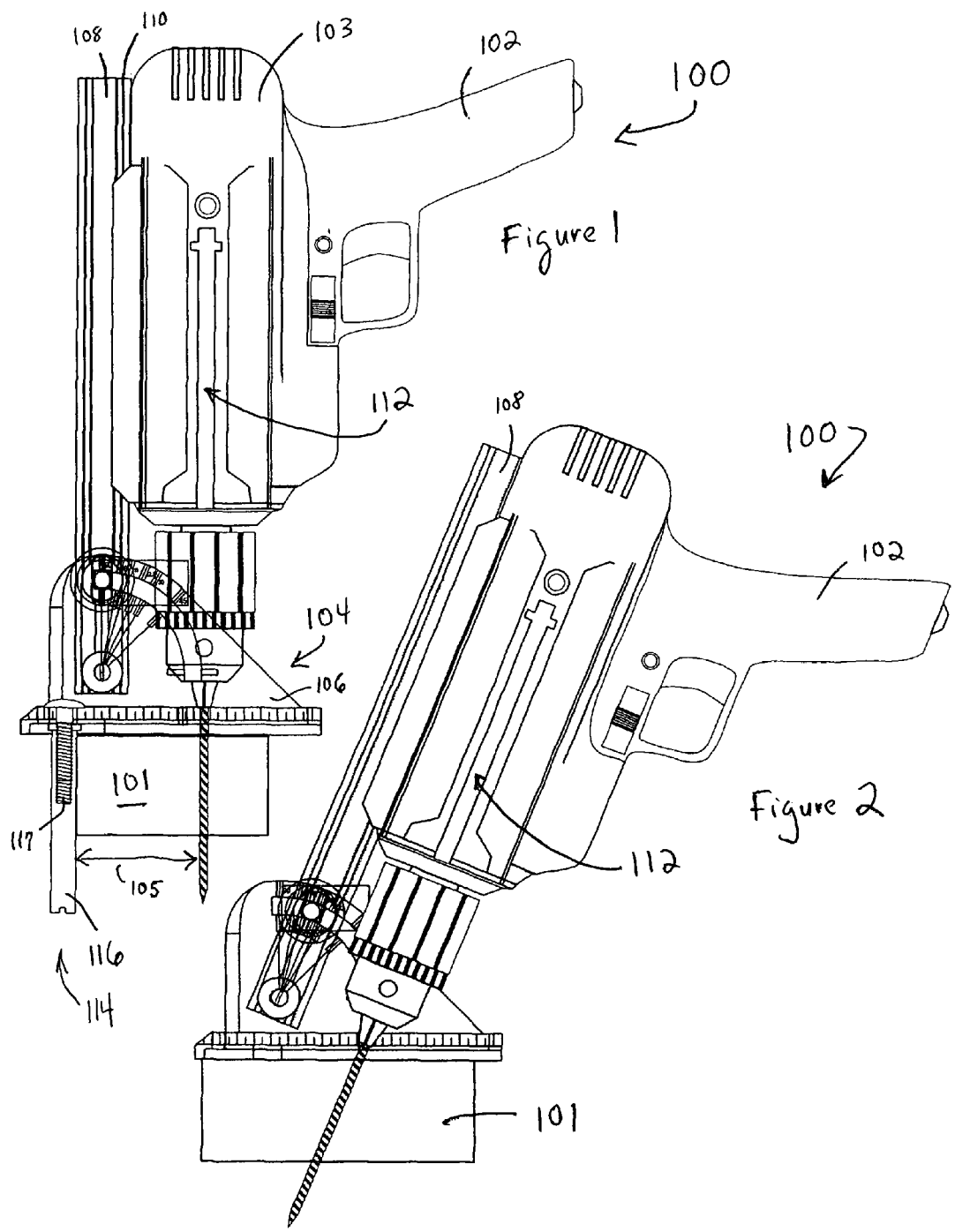

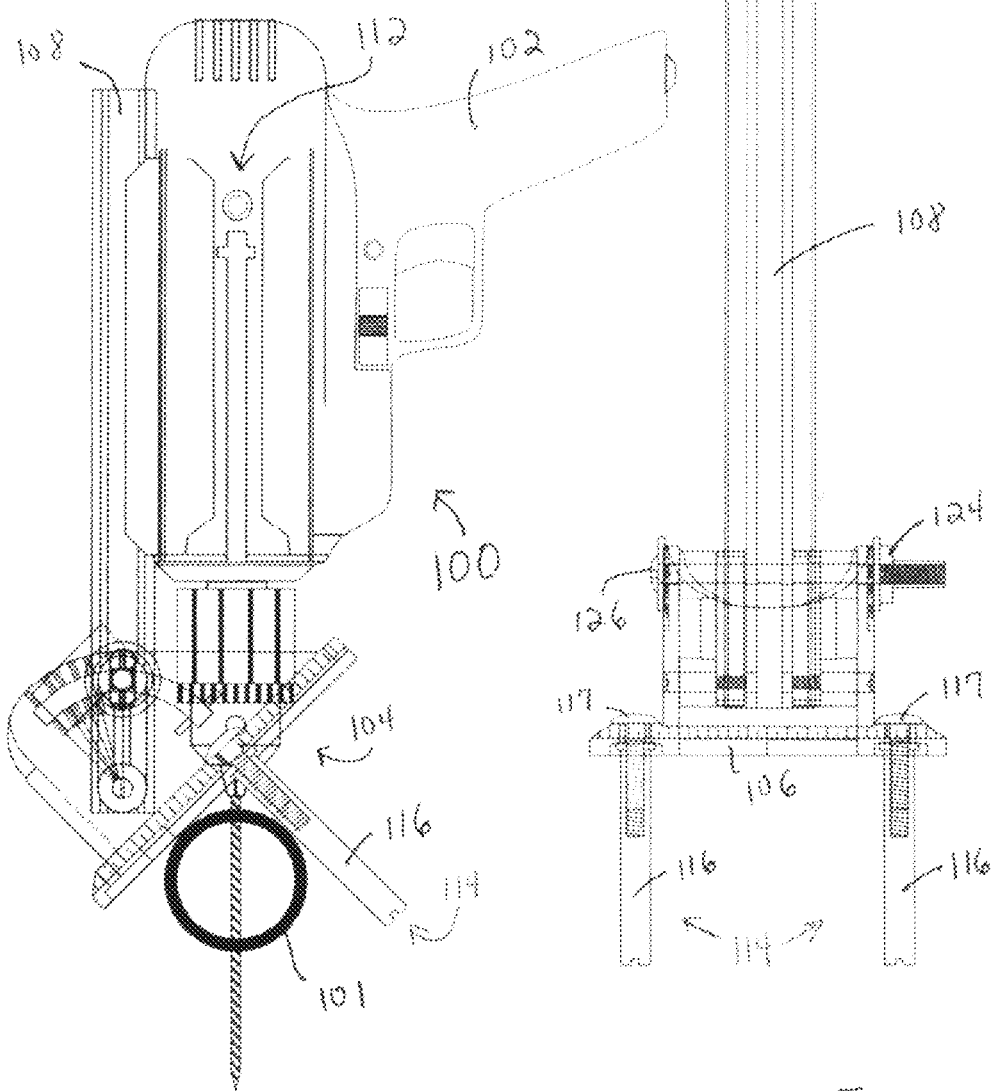

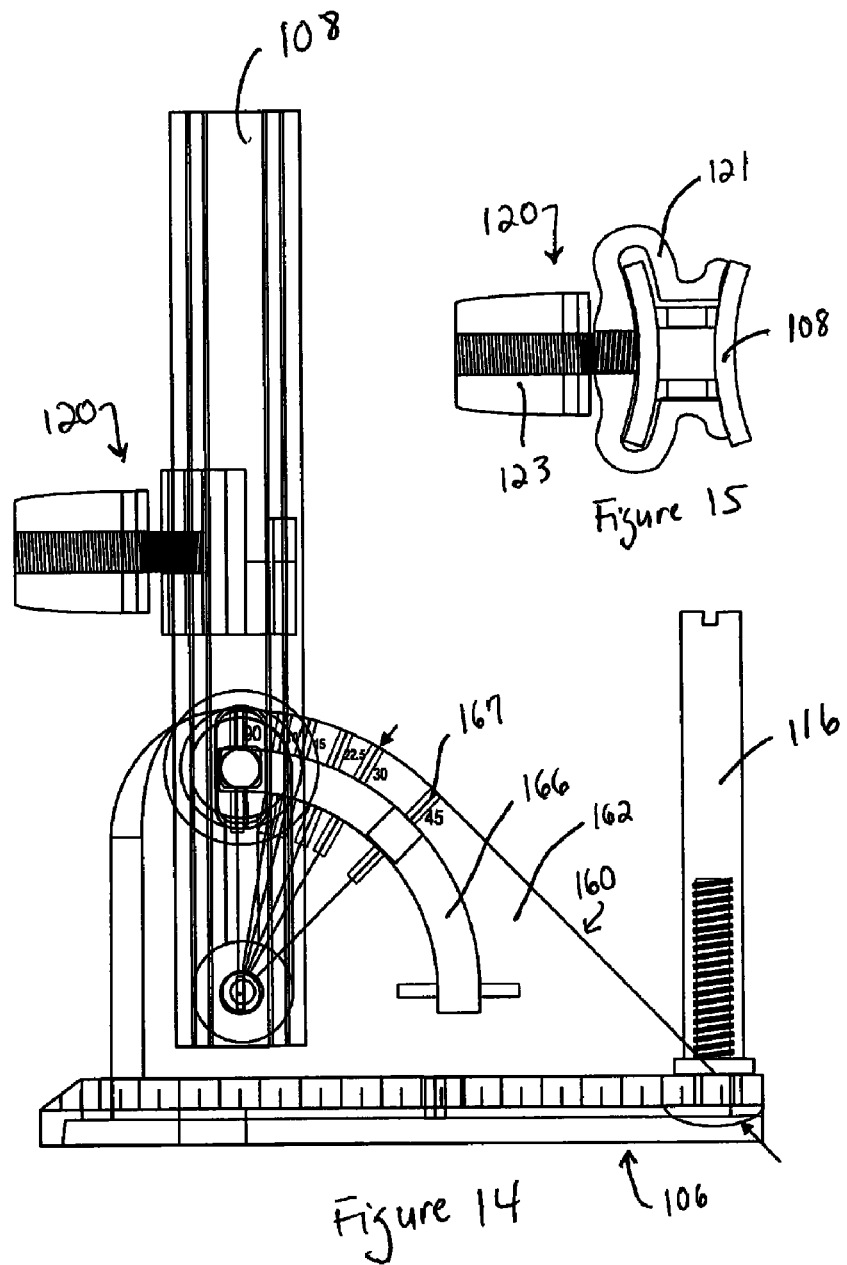

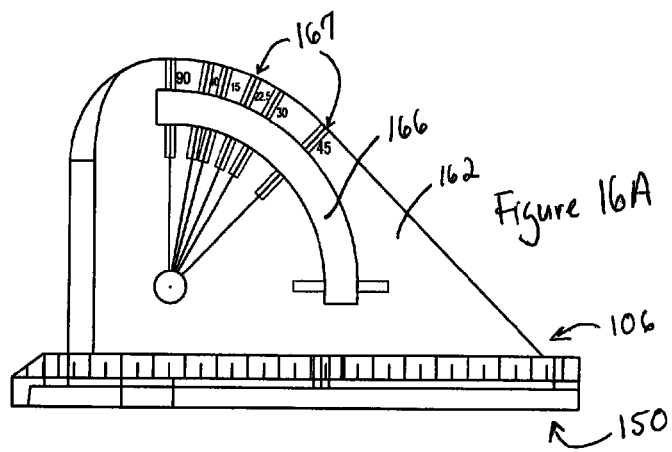
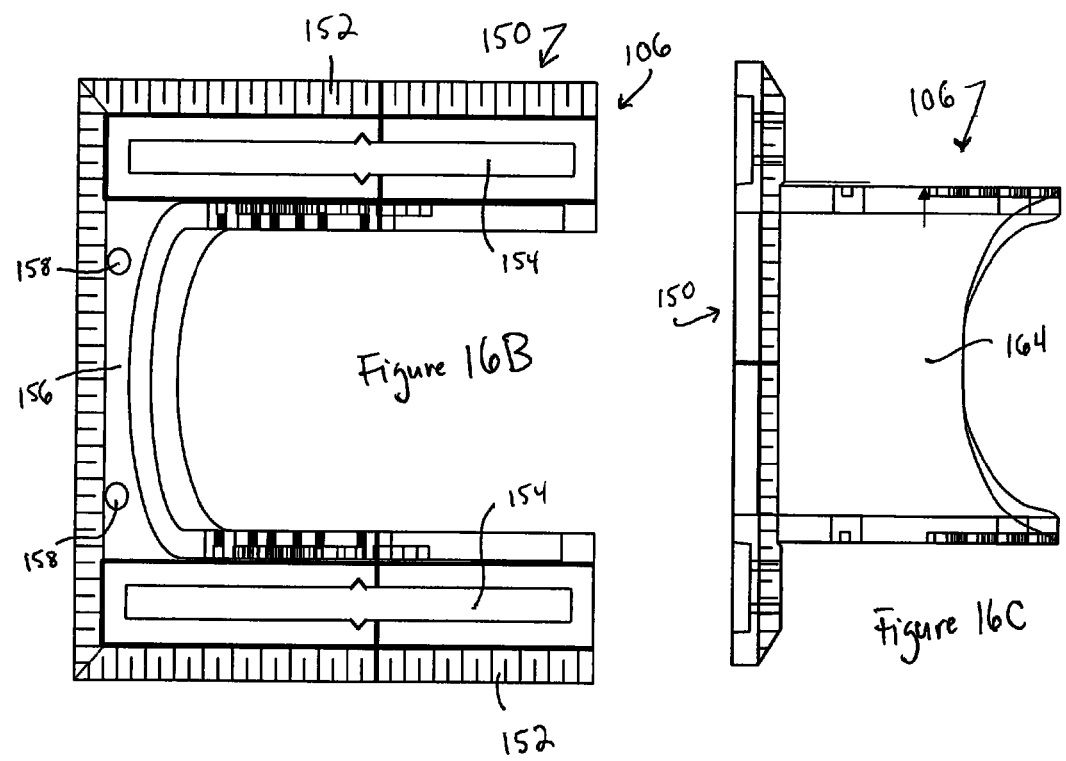

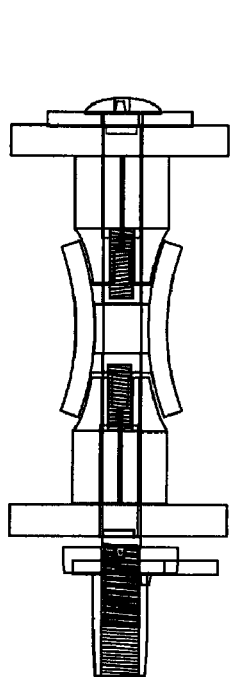
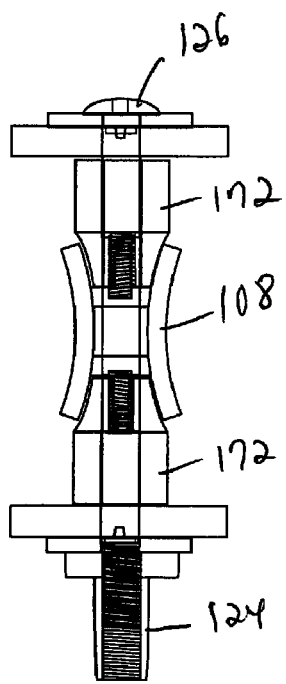
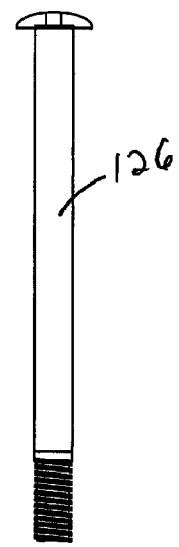
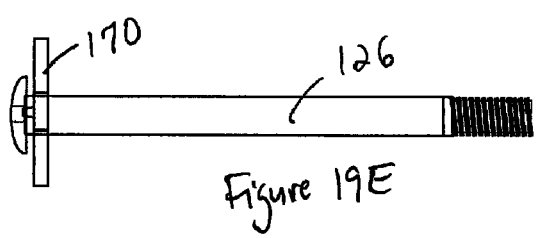
Figure 19A
Figure 19B
Figure 19C
Figure 19D
Figure 19E

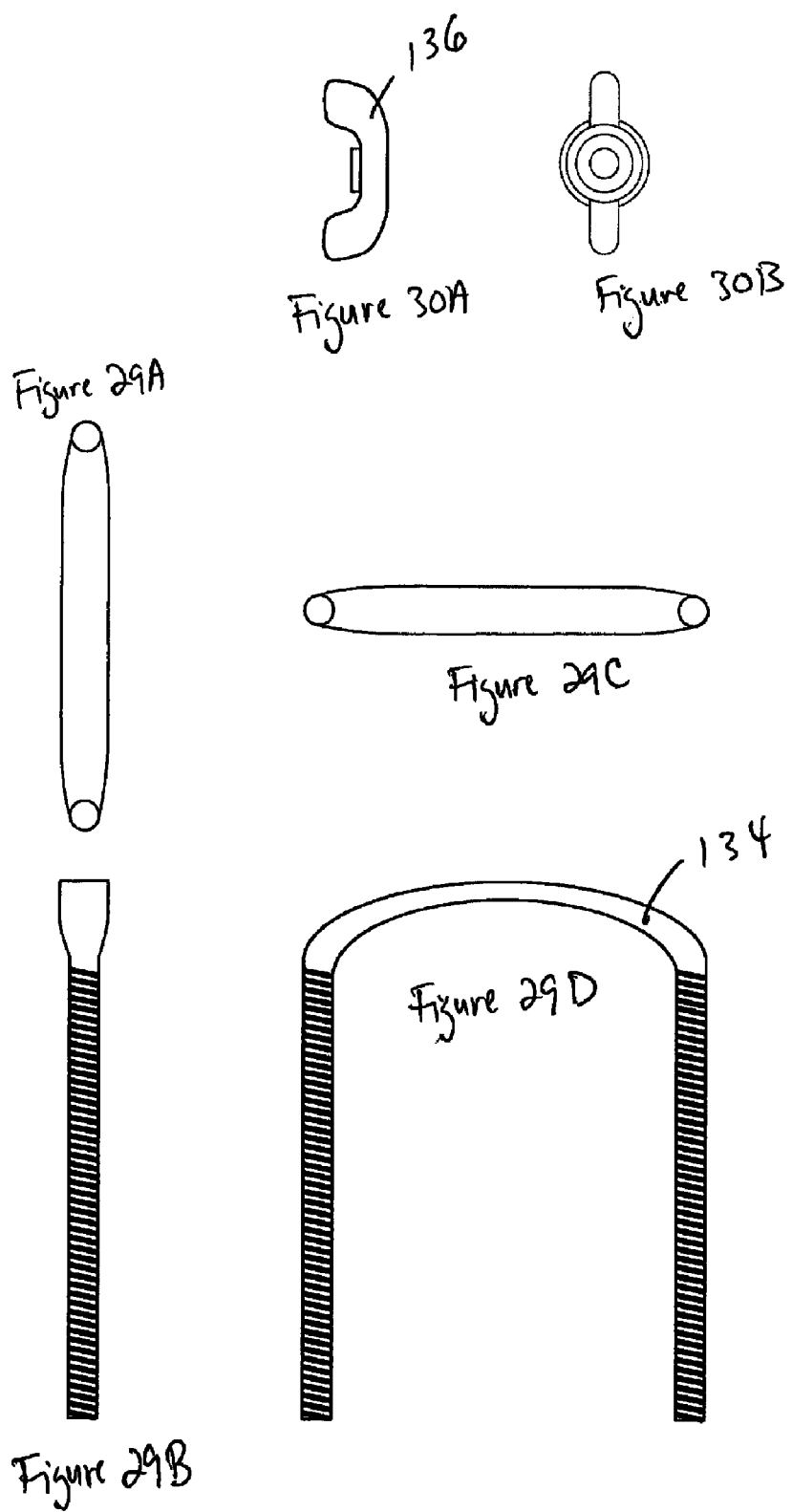

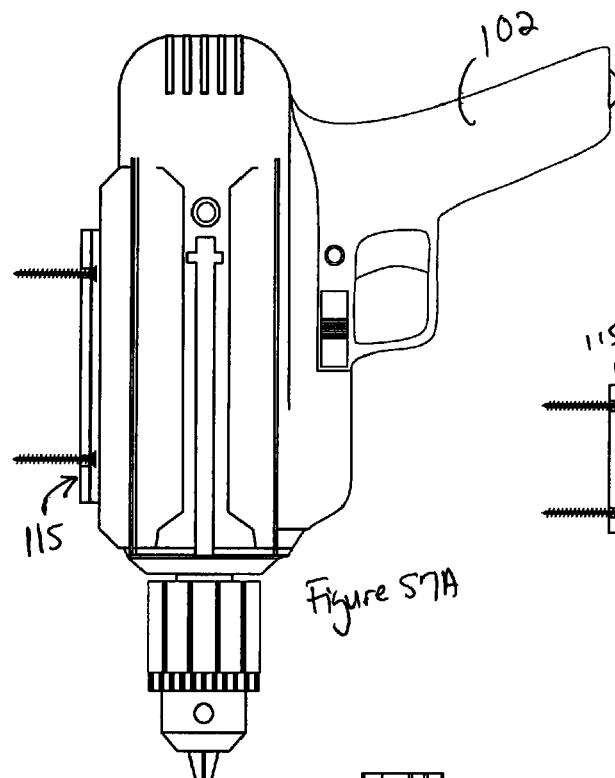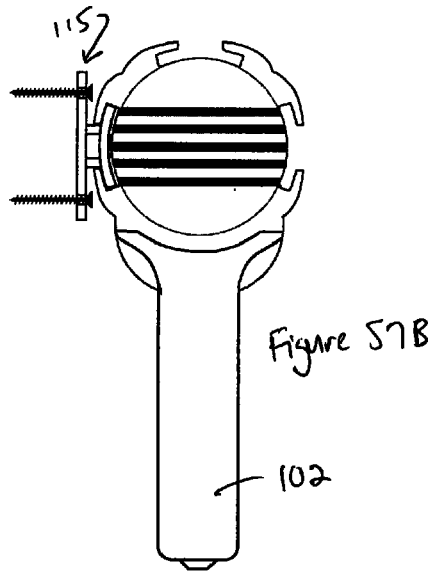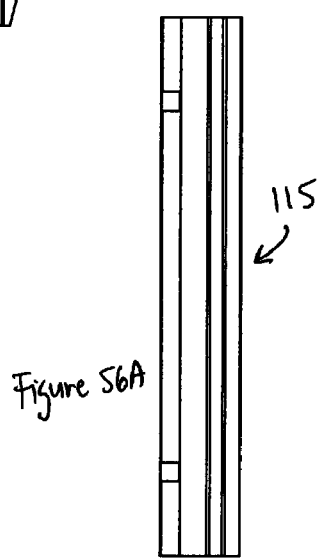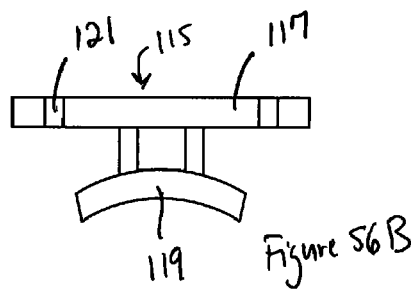
Figure 57A
Figure 57B
Figure 56A
Figure 56B

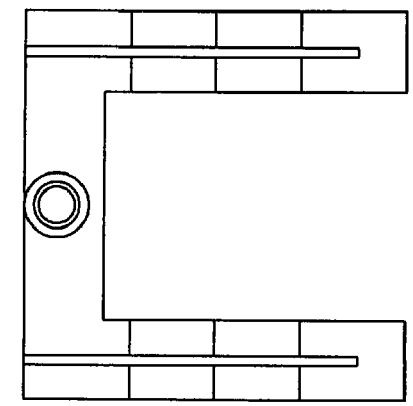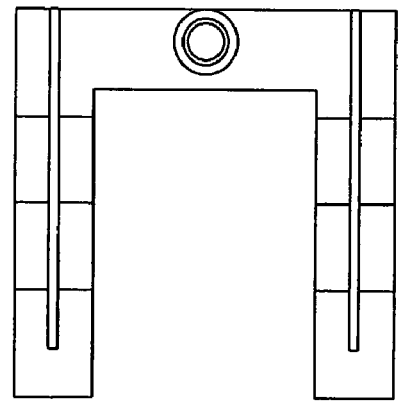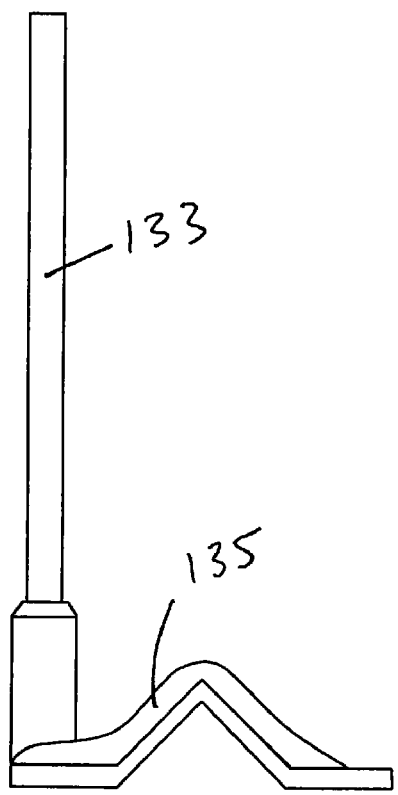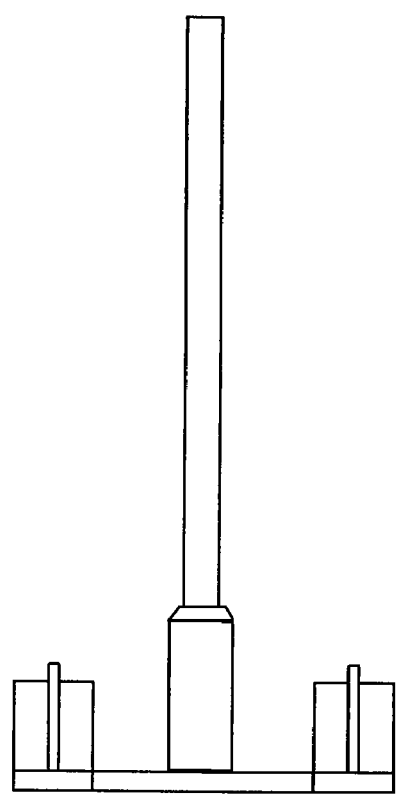
Figure 64

TOOL SYSTEM

CROSS REFERENCE TO RELATED APPLICATIONS

This application claims the benefit of one or more previously-filed copending provisional applications identified as follows: U.S. Provisional Application Ser. No. 60/802,987 filed on May 24, 2006 entitled Tool System, the entire contents of which are incorporated herein by reference.

FIELD OF THE INVENTION

The present invention relates generally to portable power tools; and more specifically to systems for (i) guiding and controlling portable power tools to enhance their precision and utility; and (ii) providing storage and attachment features for portable power tools, as well.

BACKGROUND OF THE INVENTION

Portable handheld power tools are pervasive. Such tools include, but are not limited to, saws, routers, sanders, screwdrivers, and of course, drills. Portable handheld drills, particularly corded and cordless electric drills, are uniquely useful portable power tools; and the present invention is particularly directed to handheld portable drills and drivers. For the sake of convenience, the term "drill" will henceforth refer to drills and drivers.

Portable handheld power drills have many plusses. They're portable, usually variable speed and reversible, and have, in many cases, keyless chucks that can receive a wide range of bits and other tools. But almost as a consequence of being so easy to use and portable, they are not inherently good at drilling precise, repeatable holes at a particular orientation and/or depth relative to the work piece. In addition, they have storage and charging (for cordless models) challenges and don't accommodate a variety of attachments such as lights, stud finders, lasers, handles, etc.

The present invention is preferably, though not solely, applied to a powered (e.g., corded, cordless, electric, battery, pneumatic) handheld drill; and includes a "drill guide" that operatively engages the drill motor to adjustably and precisely guide and control the drill thus significantly reducing if not eliminating the imprecision normally associated with such a tool. Additional embodiments include means for solving the above-mentioned storage, charging and attachment problems normally associated with portable handheld drills.

The primary aspect of the present invention relates to a "drill guide" that helps guide a portable handheld drill so as to increase its precision and utility. Various types of drill guides have been tried, including what might be called alignment guides, bit guides, carriage guides (housing and chuck) and housing guides. (Most of these terms have been derived by Applicants to describe the various types of drill guides.) And while aspects of the present invention could be applied to virtually any kind of drill guide, the preferred embodiment relates to the "housing guide" type of drill guide. That said, for the sake of completeness and to put the present invention into context, the other kinds of drill guides will be briefly discussed.

As noted above, the prior art includes various drill guides and related techniques and devices for addressing the fundamental shortcoming of portable power drills. One type of drill guide doesn't guide the drill motor, but rather provides visual feedback to the operator, to help the operator know when he or she is properly positioning and manipulating the drill so as to drill the desired hole. Examples of such "alignment guides" include levels (i.e. bubbles), sight apertures (e.g., U.S. Pat. No. 5,052,112) and lasers (e.g., U.S. Pat. No. 6,375,395). While such alignment guides are helpful, they do not guarantee precise drilling.

Another type of "drill guide" literally contacts the bit, as opposed to the drill motor, in an attempt to achieve a square or perpendicular hole, for example. See U.S. Des. Pat. 264,930 and U.S. Pat. No. 4,253,784. "Bit guides" are simple and inexpensive, but not particularly adjustable or precise, because, at least in part, of the inherent problems associated with directly contacting the bit.

A third and more precise type of "drill guide" could be termed a "housing carriage guide" wherein a "carriage" clamps or otherwise attaches to the drill motor housing, and the carriage in turn slidably connects to a post or "mast" assembly of some type. See U.S. Des. Pat. 291,528; and U.S. Pat. Nos. 6,860,682 and 4,349,301. The advantage of such a system is that it can be very precise; the disadvantage is the cost, complexity and additional weight of the carriage (i.e. the part or assembly that is fixed to the housing and slides on the post(s) or mast(s)).

A fourth type of "drill guide" is a "chuck carriage guide." See U.S. Pat. Nos. 5,797,708; 4,923,341; 4,836,720; and 4,391,558. In this type of drill guide, there is a slidable (again, on one or more posts or masts) carriage that itself carries an additional chuck, and this additional chuck connects to and is driven by the normal drill chuck. Such drill guides are complex and bulky, given the fact that they have an extra chuck.

A fifth type of drill guide, and the type that includes the most preferred embodiment of the present invention, is a "housing guide" drill guide. This category of drill guide typically includes a groove or slide system for conveniently interfacing one or more posts or masts with the drill motor housing. Examples of "housing guide" drill guides are disclosed in U.S. Pat. Nos. 5,361,504; 4,765,786; 4,729,698; and 6,386,802. Advantages of this type drill guide include precision and inherent simplicity, e.g., no need for an additional carriage or the like.

One of the significant limitations of prior art "housing guide" drill guides is their inability to drill a sufficiently wide variety of holes in a precise, repeatable way. For example, many housing guides include means for drilling perpendicular/square holes in flat materials such as plywood. And many include adjustable "stops" to allow the repeated drilling of a plurality of holes at a pre-set depth. And many include V-shaped means for accommodating cross-sectional drilling of round stock and other elongate work pieces. But prior art "housing guides" do not include practical means for accurately and repeatedly drilling a pre-set distance from the edge of a work piece. One guide, shown in U.S. Pat. No. 4,729,698, includes an adjustable edge guide, but the '698 edge guide is cumbersome due to use of a pair of sliding rods captured by tubular pieces and held in place by four set screws. To change the edge offset, the user has to loosen all four set screws, slide the rods in or out of the tubular pieces, and re-tighten the set screws.

And no prior art drill guides, of any type, provide or accommodate a useful array of attachments and storage options. For example, there's no convenient way to store the edge guide of the '698 patent when it's not in use; nor does the '698 edge guide provide additional functionality (that is, it is an edge guide and only an edge guide).

The present invention is an entire tool system for addressing the shortcomings of prior art drill guides, and for providing enhanced storage and accessory options as well.

SUMMARY OF THE INVENTION

The present invention includes a tool motor assembly for processing a work piece, the tool motor assembly including a tool motor and a guide assembly including a base; a mast adjustably connected to the base at a mast attachment point and extending from the base generally in a first direction, wherein the'mast slidably supports the tool motor such that it can smoothly and precisely move along the length of the mast; and a post assembly adjustably connected to the base and extending from the base in a second direction generally opposite from the first direction, wherein the post assembly attaches to the base a preset distance from the mast attachment point for a first type of work piece processing, and attaches to the base a variable distance from the mast attachment point for a second type of work piece processing.

The first type of work piece processing referred to above can be drilling a crosswise hole in a work piece; and the second type of work piece processing can be adjustably drilling a work piece relative to its edge.

Preferably, the tool motor has a housing that forms a housing slide; the mast forms a mast slide; and the slides interconnect to facilitate the smooth and precise movement of the tool motor along the length of the mast.

The housing slide can include a female structure, and the mast slide can include a male structure. Further, the female structure can include a T-shaped groove formed by the housing, and the male structure can include a T-shaped flange that slidably engages the groove.

The mast is preferably an elongate I-beam and the T-shaped flange discussed above is formed by roughly one-half of the transverse structure of the I-beam.

The I-beam flange and the T-shaped groove preferably have curved cross sections to conform, generally, to the cross sectional shape of the tool motor housing.

The post assembly preferably includes a pair of laterally-spaced posts, wherein their fixed connection to the base is accomplished by virtue of the base forming a pair of notches for non-adjustably accepting the posts, and their adjustable connection to the base is accomplished by virtue of the base forming a pair of parallel post slots for adjustably accepting the posts.

The tool motor assembly preferably further includes a rifling attachment that removably connects to the post assembly.

The tool motor assembly also preferably includes a conveniently mountable tool motor storage slide slidably connectable to the tool motor housing slide in lieu of the mast slide, whereby the tool motor can be readily stored separate from the housing guide assembly. The tool motor storage slide can be attached to a belt (i.e. worn by an operator), a wall, cabinet, bench or storage case, for example. A charger can be integrated into the tool motor storage slide, whereby the tool motor can be automatically recharged when it is seated on its storage slide.

The tool motor assembly can also include a conveniently mountable housing guide assembly storage slide slidably connectable to the mast slide in lieu of the tool motor housing slide, whereby the guide assembly can be readily stored separate from the tool motor.

The tool motor assembly preferably includes an accessory having an accessory slide that slidably connects to the housing slide. Potential accessories include a stud finder, light, bit/fastener holder, etc.

The tool motor assembly can include a conveniently mountable accessory storage slide slidably connectable to the accessory slide in lieu of the tool motor housing slide, whereby the accessory can be readily stored separate from the tool motor.

Another embodiment of the present invention is a tool motor assembly for processing a work piece, the tool motor assembly including a tool motor; and a guide assembly including a base and a mast adjustably connected to the base at a mast attachment point and extending from the base generally in a first direction, wherein the mast slidably supports the tool motor such that it can smoothly and precisely move along the length of the mast, and wherein (i) the tool motor includes a housing and a housing slide, and the mast includes a mast slide, wherein the slides slidably connect together to enable the tool motor to smoothly and precisely move along the length of the mast during processing of the work piece; (ii) the housing slide includes a female structure, and the mast slide includes a male structure; (iii) the female structure includes a T-shaped groove formed by the housing, and the male structure includes a T-shaped flange that slidably engages the groove; (iv) the mast is an elongate I-beam and the T-shaped flange is formed by roughly one-half of the transverse structure of the I-beam; and (v) the I-beam and the T-shaped groove have curved cross sections to conform, generally, to the cross sectional shape of the tool motor housing.

Still another embodiment of the present invention is a tool motor assembly for processing a work piece, the tool motor assembly including (1) a tool motor; (2) a guide assembly including a base and a mast adjustably connected to the base at a mast attachment point and extending from the base generally in a first direction, wherein the mast slidably supports the tool motor such that it can smoothly and precisely move along the length of the mast, wherein the tool motor includes a housing and a housing slide, and the mast includes a mast slide, and wherein the slides slidably connect together to enable the tool motor to smoothly and precisely move along the length of the mast during processing of the work piece; and (3) a conveniently mountable tool motor storage slide slidably connectable to the tool motor housing slide in lieu of the mast slide, whereby the tool motor can be readily stored separate from the housing guide assembly.

And another embodiment of the present invention is directed to a tool motor assembly for processing a work piece, the tool motor assembly including (1) a tool motor; (2) a guide assembly including a base and a mast adjustably connected to the base at a mast attachment point and extending from the base generally in a first direction, wherein the mast slidably supports the tool motor such that it can smoothly and precisely move along the length of the mast, wherein the tool motor includes a housing and a housing slide, and the mast includes a mast slide, and wherein the slides slidably connect together to enable the tool motor to smoothly and precisely move along the length of the mast during processing of the work piece; and (3) an accessory having an accessory slide that slidably connects to the housing slide.

One embodiment of the invention is not even tied to a particular type of tool or tool motor. This embodiment is directed to a tool motor assembly having a tool motor with a housing forming or including a housing slide; an accessory having an accessory slide that slidably connects to the housing slide; and a conveniently mountable tool motor storage slide that slidably connects to the housing slide in lieu of the accessory slide whereby the tool motor can be readily stored.

Finally, the various features and the like (e.g., ability to, accept accessories having a "slide", ability to be stored on a bracket that includes a "slide", ability to be automatically recharged by simply placing on a storage bracket slide, etc.)

can all be used with any of the various embodiments of the invention described above and below.

BRIEF DESCRIPTION OF THE DRAWINGS

FIG. 1 is a side elevational view of a preferred drill motor assembly of the present invention, drilling a "vertical" hole in a work piece at a preselected offset from the work piece edge;

FIG. 2 is a side elevational view of the drill motor assembly of FIG. 1, drilling an angled hole in a work piece;

FIG. 4 is a side elevational view of the drill motor assembly of FIG. 1, cross drilling a hole in a tubular work piece;

FIG. 5 is an end elevational view of the drill motor assembly of FIG. 1;

FIG. 14 is a side elevational view of the housing guide assembly of FIG. 1, with the post assembly in its storage position and the limit clamp adjustably secured to the mast;

FIG. 15 is a sectional view of the limit clamp adjustably secured to the mast;

FIGS. 16A-16C are orthogonal views of the base of the housing guide assembly;

FIGS. 19A-19E are various orthogonal views of the square-shafted, slotted-head carriage bolt of the housing guide assembly of FIG. 1;

FIGS. 29A-29D are various orthogonal views of the rifling assembly U-bolt;

FIGS. 30A-30B are orthogonal views of the wing nuts used to secure the rifling attachment U-bolt;

FIGS. 35 and 36 show the drill motor of FIG. 1, attached to which is a device for carrying bits, fasteners and the like;

FIGS. 56A-56B show a storage bracket for the drill motor of FIG. 1;

FIGS. 57A-57B show the drill motor of FIG. 1 engaged with the storage bracket of FIG. 56;

FIG. 64 shows various orthogonal views of a simplified housing guide assembly according to the present invention;

DETAILED DESCRIPTION OF PREFERRED EMBODIMENTS

The following detailed description of preferred embodiments will be broken down into five sections, namely (i) basic system; (ii) basic system operation; (iii) accessories; (iv) storage solutions; and (v) alternative embodiments.

Basic System

Referring to FIG. 1, a first preferred embodiment of a tool motor assembly according to the present invention is shown. More specifically, FIG. 1 shows a preferred drill motor assembly 100 capable of accurately and precisely drilling holes of various depths, edge offsets and angles in work piece 101. And, as noted above, a "drill" as that term is used herein, could be any powered (e.g., corded, cordless, electric, battery, pneumatic) handheld drill or driver. What's more, many aspects of the present invention could be applied to other types of tools. See, for example, the nail gun shown in FIGS. 60 and 61.

Figure 62:
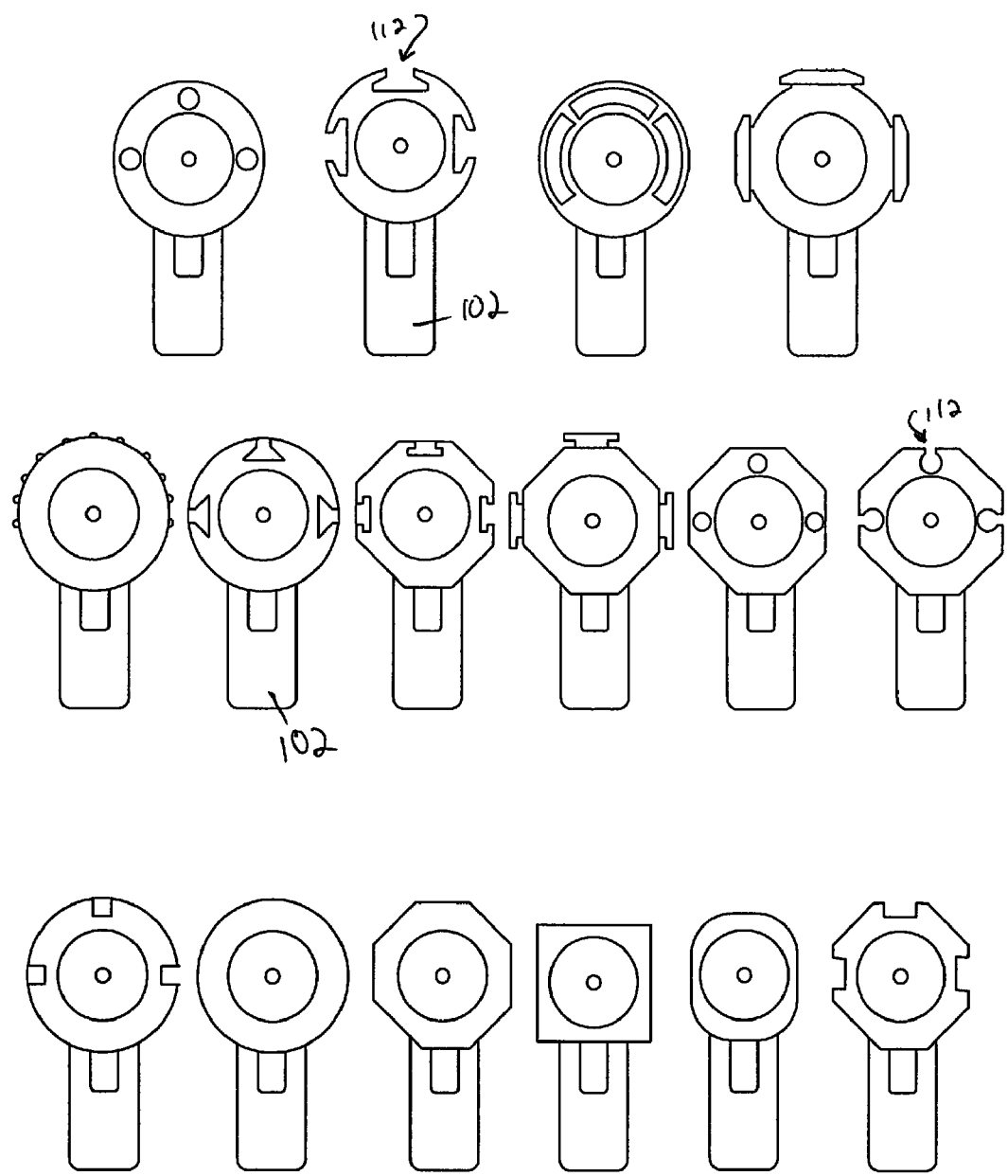
FIG. 62 shows end elevational views of a number of different housing slide configurations for tool motors.

Preferred drill motor assembly 100 includes a drill motor 102, that itself includes a drill motor housing 103, and a separable and adjustable housing guide assembly 104. Housing guide assembly 104 includes a base 106 and an elongate adjustable mast 108 pivotally connected thereto. In this embodiment, mast 108 forms a male mast slide 110 that slidably engages a female housing slide 112 attached to or formed in the drill housing 103. It should be noted that the mast could, in an alternative embodiment, form the female half of the slide assembly, with the drill housing carrying, or forming, the male half. FIG. 62 shows a variety of slide configurations, some having male housing slides and some having female housing slides.

It should particularly be noted that, in the most preferred embodiment of the present invention, the "female" grooves 112 in the drill motor housing are generally T-shaped, but preferably curved to more closely follow the inherent shape of the typical drill motor, in cross section.

As noted and shown throughout this document, the drill motor housing 103 would preferably carry multiple slides 112, typically arranged orthogonally around the periphery of the drill motor housing 103, so that drill motor 102 can be slidably connected to the mast 108 in various orientations, depending on the drilling or driving work to be performed, or for that matter, the tool storage requirements, discussed below. In fact, in the most preferred embodiment of the present invention, the motor housing 103 carries three female slides 112, one on either side and one on the top, to further increase the versatility of the system. In FIG. 1, it is the top housing slide 112 that engages the mast slide 110.

FIG. 1 shows a typical application for a preferred drill motor assembly 100 of the present invention. Here, the mast 108 is adjusted so that it is at a right angle to the base 106, and the tool is thus able to quickly, precisely and repeatably drill perfectly perpendicular (square) holes in the planar work piece 101. More specifically, FIG. 1 shows the drill motor assembly 100 drilling a hole spaced a preselected distance or offset 105 from the edge of the work piece 101. A "post assembly" 114 (i.e. in this preferred embodiment, two metal posts 116 extending downwardly from the bottom surface of the base 106) is properly positioned on the base, to establish the preselected offset 105.

As further shown and described below, the drill motor 102 and the housing guide assembly 104 are readily separable, so that the drill motor 102 can preferably be used freehand, without the benefit of the housing guide assembly 104.

Figure 3:
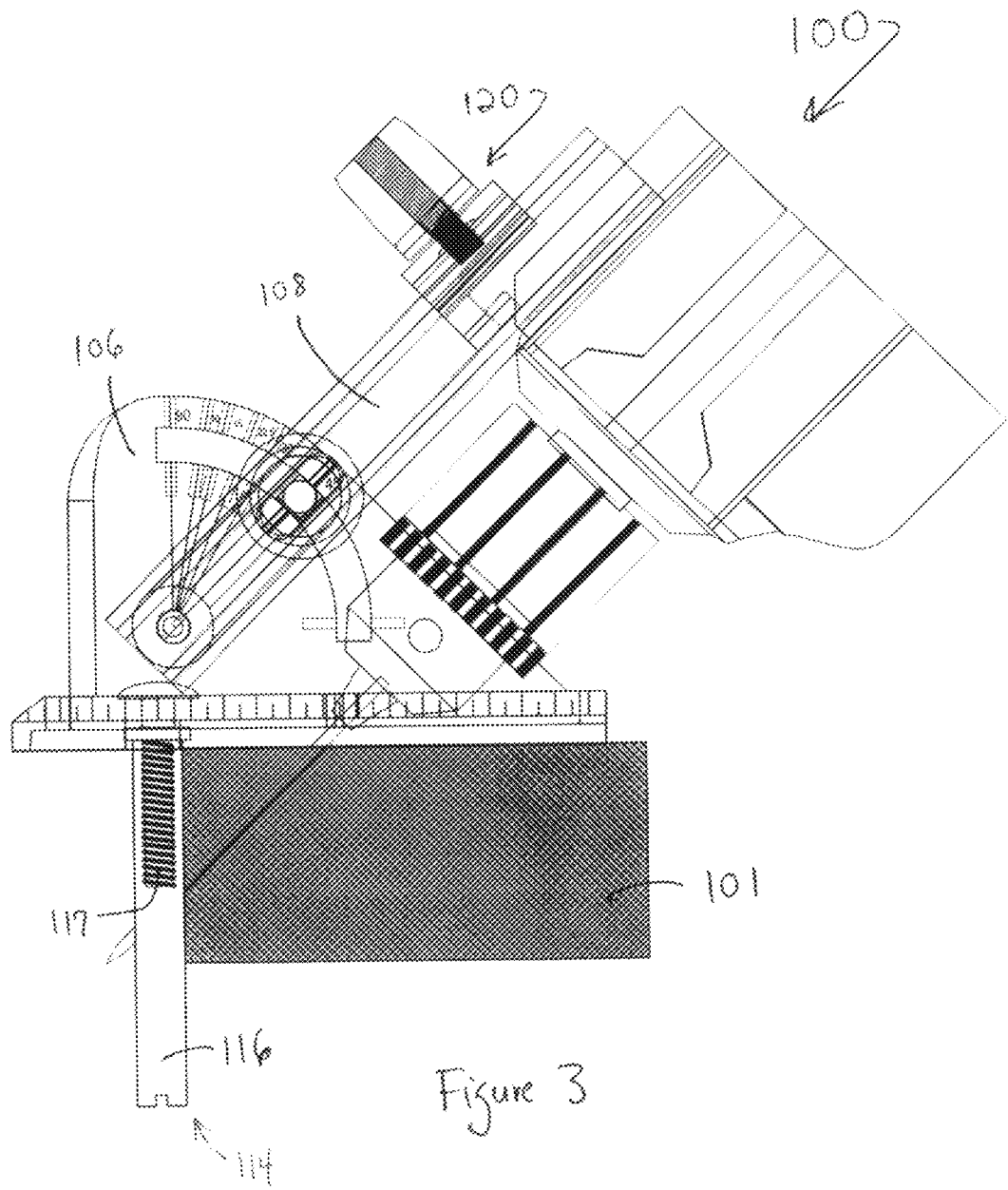
FIG. 3 is an enlarged side elevational view of the drill motor assembly of FIG. 1, drilling an angled and offset hole in a work piece to a preselected depth.

FIGS. 2 and 3 show the drill motor assembly 100 (including the drill motor 102 and the housing guide assembly 104 slidably engaged therewith) configured in such a way as to drill an angled hole in a planar work piece 101. In FIG. 3, the preselected angle is 45 degrees from the vertical.

FIG. 3 also introduces a limit clamp 120 that can be adjustably clamped at any location along the length of mast 108 so as to provide a stop that bears against the drill housing 103 to facilitate the drilling of holes having a precise, repeatable depth. Mast 108 could even carry marks or graduations, so the operator could more easily adjust limit clamp 120 to facilitate drilling to a particular preset depth.

Figure 6:
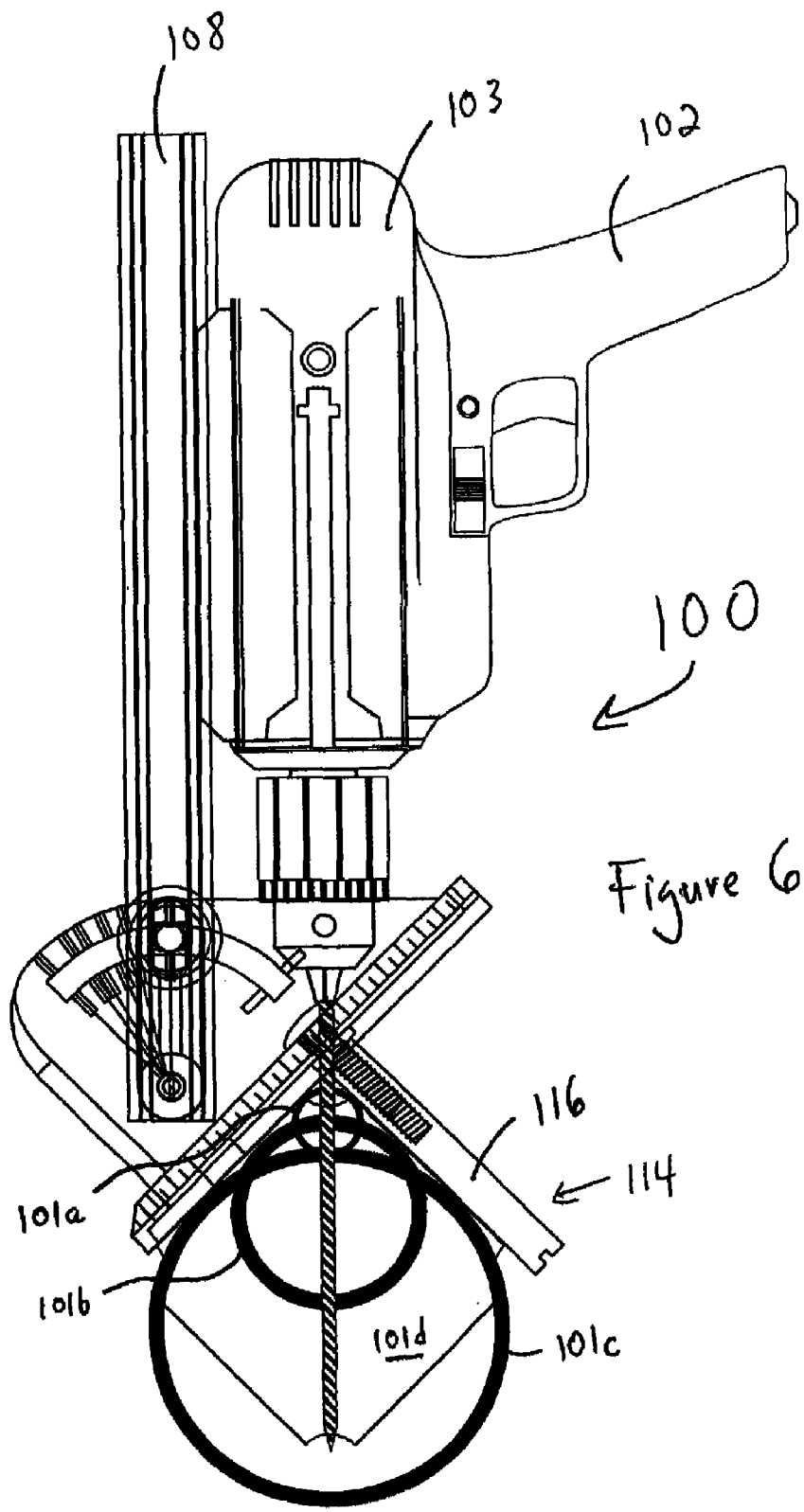
FIG. 6 is a side elevational view of the drill motor assembly of FIG. 1, similar to FIG. 4, cross drilling holes in various tubular and elongate work pieces.
Figure 7:
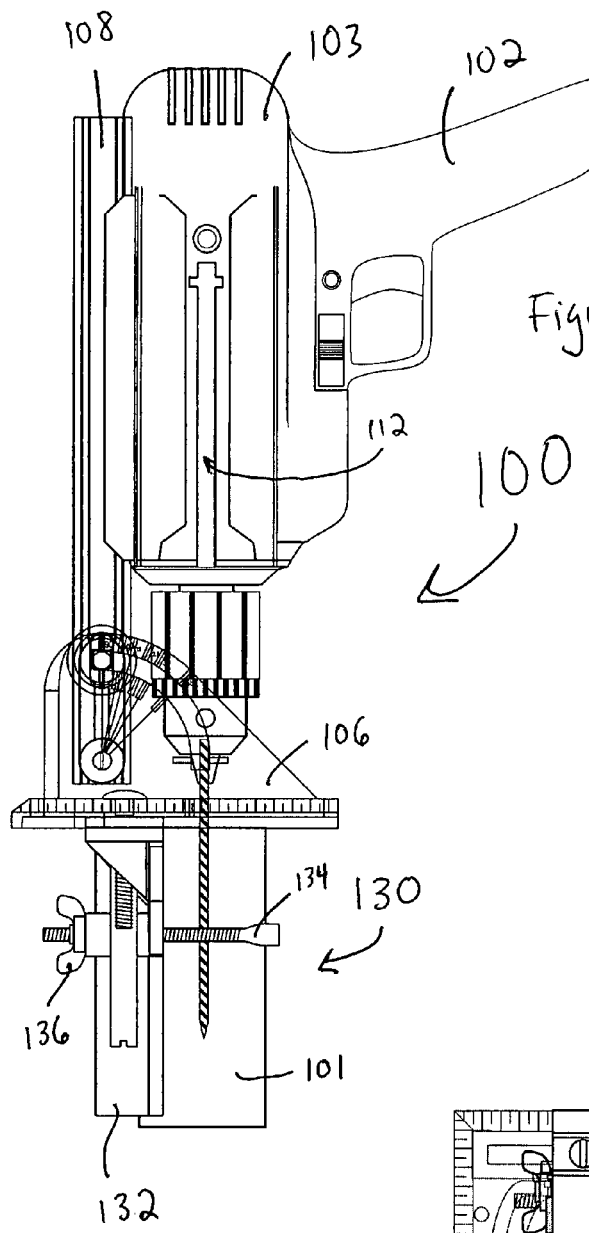
FIG. 7 is a side elevational view of the drill motor assembly of FIG. 1, wherein the drill motor assembly includes a rifling attachment.
Figure 8:
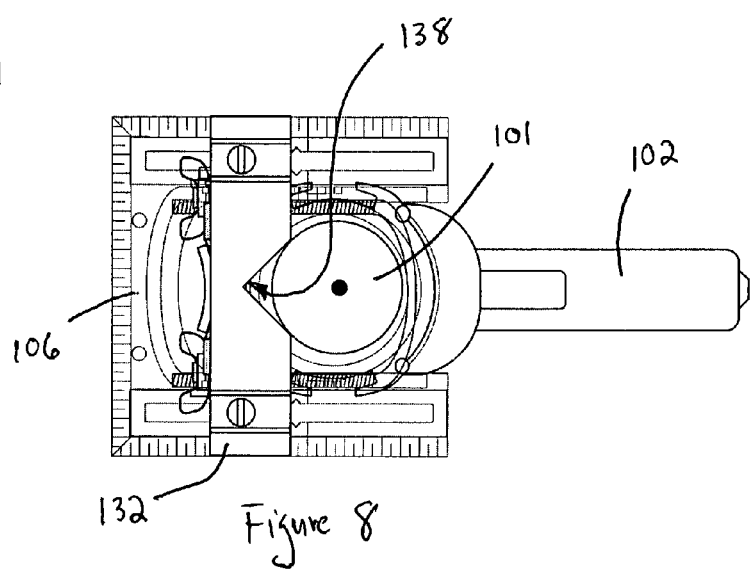
FIG. 8 is a bottom plan view of the drill motor assembly of FIG. 7.

FIGS. 4 and 6 show the drill motor assembly 100 drilling a precisely centered, diametral cross-wise hole in an elongate work piece 101, e.g. a metal tube. As further discussed below, this simply requires that the posts 116 be properly positioned in slots in the base 106, and the mast 108 be properly adjusted relative to the base 106. FIG. 6 illustrates how the cross-drilling operation can be used with elongate/tubular work pieces having various sizes and shapes. That is, cross drilling can be done on relatively small tubular work piece 101a all the way up to relatively large work piece 101c, and even on square cross section work piece 101d. Other shapes and sizes can be cross drilled as well.

Further with regard to FIGS. 1-6, inclusive, a preferred drill motor assembly 100 of the present invention includes a mast 108 pivotally attached to and extending in a "first direction," upwardly in FIG. 1, from the base 106. The mast 108 pivots about an axis formed by a pair of bearing bolts 122; and the mast is locked into the selected angle by tightening a securing knob 124 that threadedly attaches to a carriage bolt 126 that, in the most preferred embodiment, extends through a thru hole in the mast, which is preferably though not necessarily extruded aluminum. Extending in a "second direction" from the base 106, downwardly in FIG. 1, is a post assembly 114, preferably made up of a pair of metal guide posts 116 that are preferably drilled and tapped to accept guide post bolts 117 that adjustably secure the guide posts 116 to the base 106.

FIGS. 4 and 6 show how when the guide posts 116 are properly positioned (e.g., in notches 125 as shown in FIG. 16B) and the mast is set at a 45 degree angle, then perfect cross-wise (diametral, in the case of a round object, e.g., a tube) holes may be easily drilled. Thus, the guide posts 116, in this preferred embodiment, not only adjust in the base 106 to permit edge drilling at various offsets 105, as shown in FIGS. 1 and 3, but also create, when properly positioned in the base 106, a way to do cross-drilling of various elongate work pieces such as tubes, solid round stock, rectangular stock (e.g., table legs), and other shapes as well.

Figure 11:
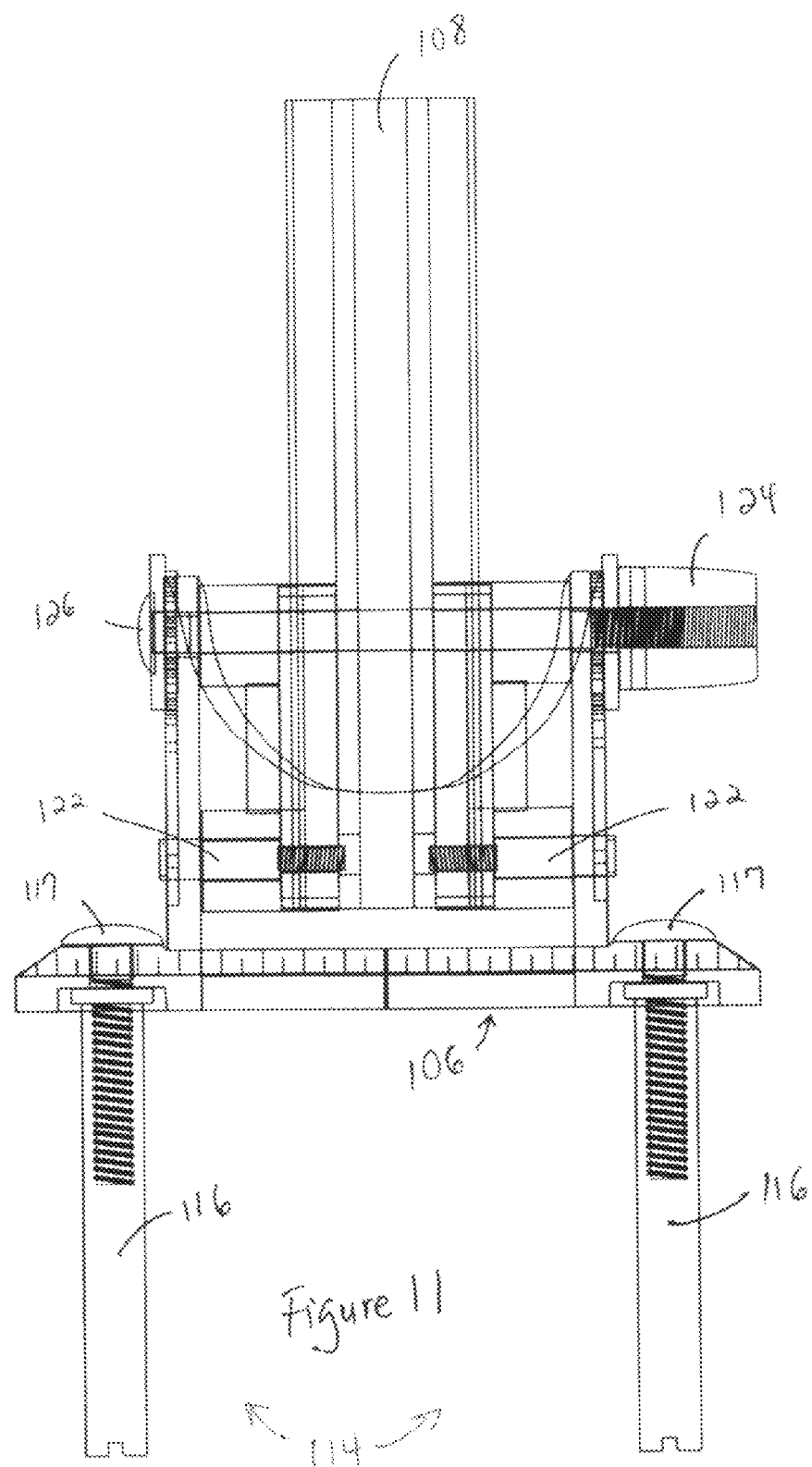
FIG. 11 is an end elevational view of the drill motor assembly of FIG. 7, with the rifling attachment removed.

FIG. 3 illustrates how the guide posts 116, extending downwardly from the base 106 in this drawing, can be adjusted in thru slots 154 in the base 106 to allow for the drilling of angled holes offset from the edge of a work piece by a precise, pre-selected distance. While it may appear in FIG. 3 that the drill bit may actually contact the post assembly 114, in the preferred embodiment this is avoided by using a pair of guide posts 116 that are separated from each other to permit the bit to pass therebetween, irrespective of the angle of the mast 108 relative to the base 106. FIGS. 5 and 11 show how the guide posts are spaced from one another, in fact equally spaced on either side of the mast in this preferred embodiment, to permit the drill bit to freely pass therebetween during angle drilling.

Figure 12:
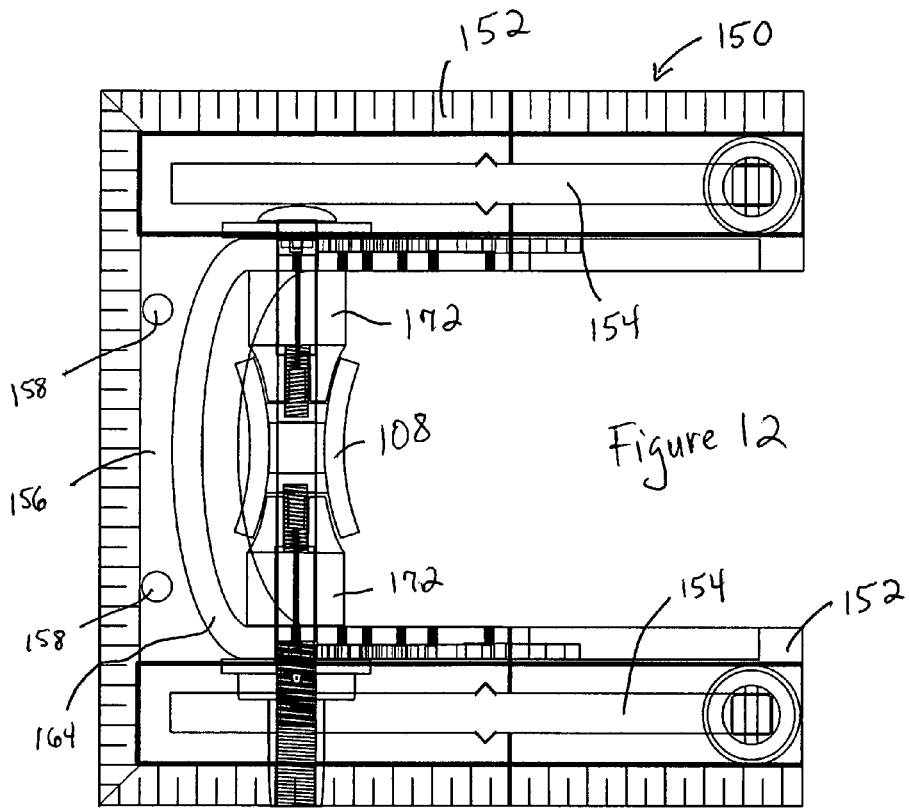
FIG. 12 is a top plan view of the housing guide assembly of the drill motor assembly of FIG. 1, with the mast in its "vertical" position relative to the base.

FIGS. 12-15, inclusive, show detailed drawings of the preferred housing guide assembly 104 of the present invention. FIG. 12 is an overhead plan view of the housing guide assembly, with the mast 108 oriented at a right angle relative to the base 106. The base 106 is preferably molded plastic, including a flat U-shaped "frame" portion 150; and another U-shaped, in plan view, "brace" portion 160 that extends upwardly from the frame 150 when the frame is positioned horizontally on a work piece. The base 106 can be made from clear plastic, so that when the housing guide assembly is being used the operator can still see the work piece. Also, a clear base increases the utility of graduations on the frame and brace.

The frame 150 has a pair of spaced, parallel frame legs 152, each forming an elongate parallel slot 154 to accept one of the guide post bolts 117. Connecting the frame legs 152, at the "bottom of the U" is a relatively short spanner section 156. Note the spanner 156 can include one or more holes 158 or the like to facilitate the connection of a stud sensor, for example.

The brace 160 includes a pair of slotted side pieces 162 and a solid (i.e. unslotted) curved (in plan view) back piece 164, all interconnected to form a single, integral u-shaped brace 160 that wraps around and extends upwardly from (in FIGS. 1 and 2, for example) the opening formed by the legs 152 and spanner 156 of the frame 150.

Each brace side piece 162 forms a graduated constant-radius curved slot 166. Immediately above and below each slot 166 are graduations, marking the most common drilling angles from the vertical, e.g., 10, 15, 22.5, 30, and 45 degrees. In fact, there are shallow notches or detents 167 formed in the outer surfaces of the side pieces, on either side of the curved slots 166, at these common angles. These shallow detents 167 are at right angles to the corresponding slot 166, and are designed to accept tabs extending from reversible locking disks 170 that permit the mast to "snap" into place at these common angles, for quick and accurate adjustment.

A pair of mast spacers 172 engage the spaces in the mast 108 formed between the curved flanges of the mast. The bearing bolts 122 thread into the lower portions of the spacers 172.

FIG. 11 shows an elevational view of the preferred embodiment of the housing guide assembly 104 of the present invention. In fact, FIG. 11 is an end view of the housing guide assembly, such that the free end of the mast 108 pivots toward and away from the viewer. This drawing shows how the guide posts 116 are spaced apart to permit the drill bit to extend down between them if need be. And the bearing bolts 122 are shown threading into the bottom holes of the two mast spacers 172 that are sandwiched between the mast and the inner surfaces of the side pieces 162 of the brace 160 that extends upwardly from the U-shaped frame 150. The mast spacers 172 are themselves U-shaped, with top and bottom cylindrical bosses 180 spanned by a web 182 (see FIG. 18). The mast spacers 172 face away from one another, with each of their back surfaces forming a rib 184 that is sized and configured to fit snugly into the gap formed by the curved flanges of the mast.

Figure 23A:
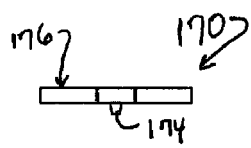
FIGS. 23A-23C show various orthogonal views of the reversible locking disk of the housing guide assembly of FIG. 1.
Figures 23B, 23C:
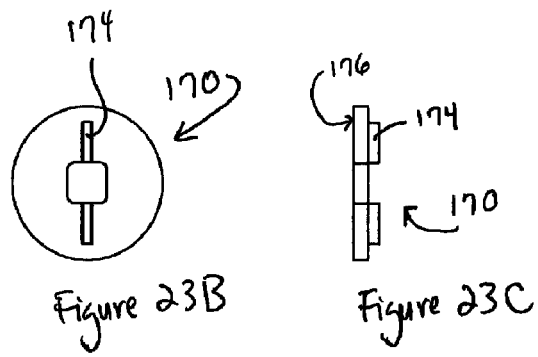
Figure 24A:
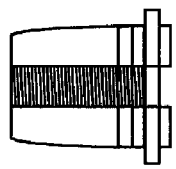
FIGS. 24A-24B show the knob of FIG. 22 and disk of FIG. 23 assembled together.
Figure 24B:
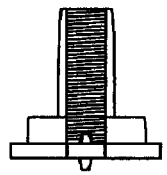
Figure 27A:
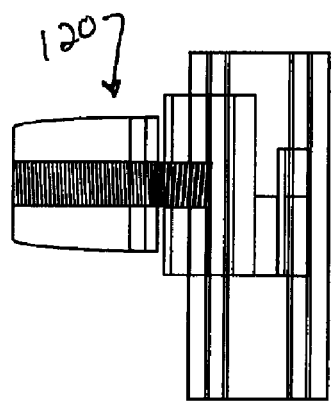
FIGS. 27A-27B are views of the limit clamp adjustably attached to the mast.
Figure 27B:
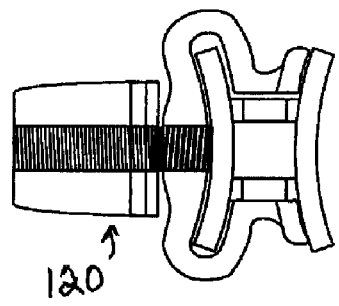
Figure 25:
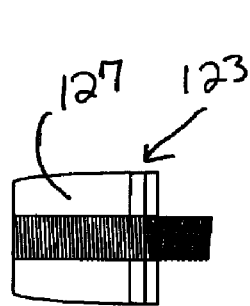
FIG. 25 is a side elevational view of the tightening knob of the limit clamp.
Figure 26A:
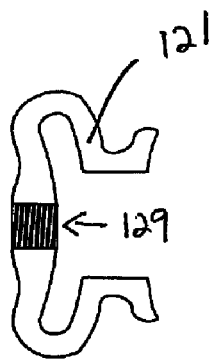
FIGS. 26A-26B show various orthogonal views of the body of the limit clamp.
Figure 26B:
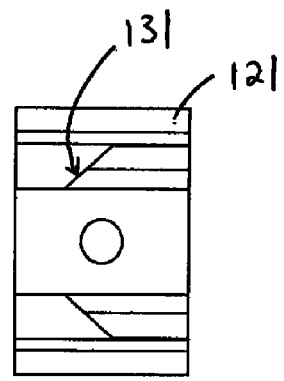

With particular reference to FIGS. 23 and 24, there are two reversible washer-like locking disks 170, one on each end of the carriage bolt 126 that extends through thru hole 127 in the mast. Each locking disk 170 has a tab 174 on one side that can snap into the detents 167 on the outer surfaces of the side pieces 162 of the brace 160, if one of the pre-set angles (e.g., 45 degrees) is desired. If, on the other hand, an angle other than one of the pre-set angles is desired, the disks 170 can be flipped over such that their smooth surfaces 176 engage the outer surfaces of the brace side pieces 162. FIG. 19A shows how the disks 170 are positioned such that their smooth surfaces 176 face the brace 160; and FIG. 19B shows, by contrast, how the disks 170 can be flipped so that their tabbed surfaces face the brace, so that tabs 174 can be readily located in the preselected detents 167.

Figure 13:
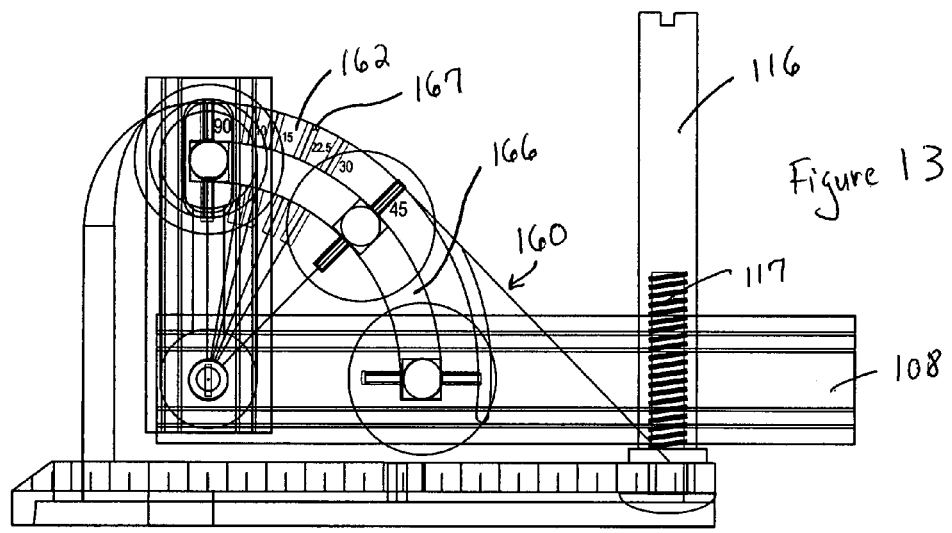
FIG. 13 is a side elevational view of the housing guide assembly of FIG. 1, with the mast shown in multiple positions relative to the base, and the post assembly in its storage position.
Figure 17A:
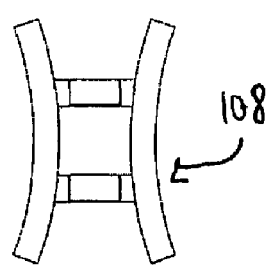
FIGS. 17A-17D are orthogonal views of the mast of the housing guide assembly.
Figure 17B:
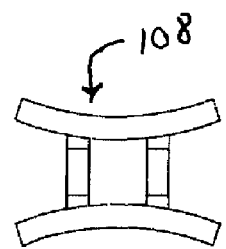
Figure 17C:
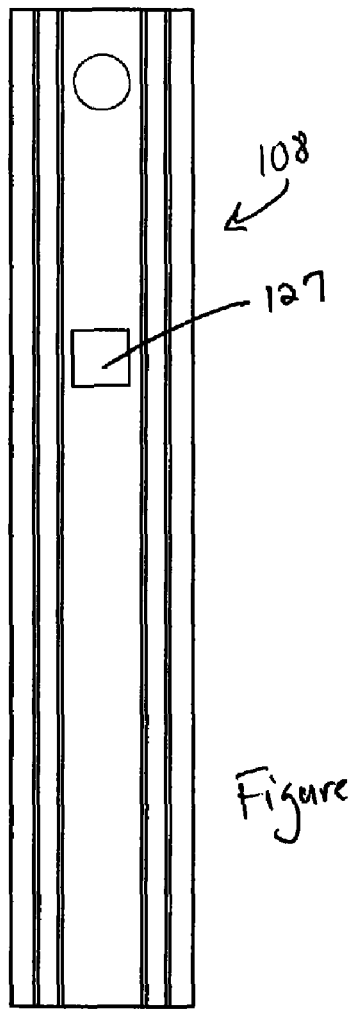
Figure 17D:
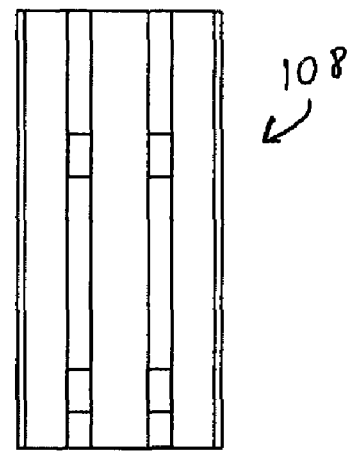
Figure 18A:
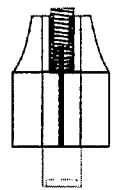
FIGS. 18A-18H are various orthogonal views of the mast spacers and bearing bolts of the housing guide assembly of FIG. 1.
Figure 18B:
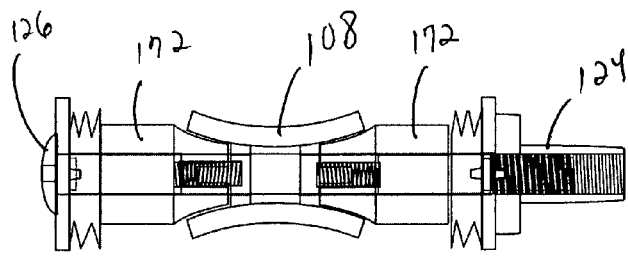
Figure 18C:
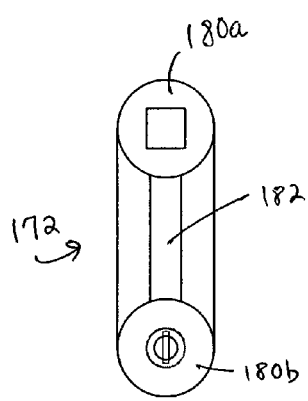
Figure 18D:
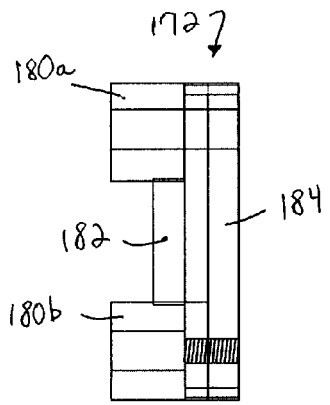
Figure 18E:
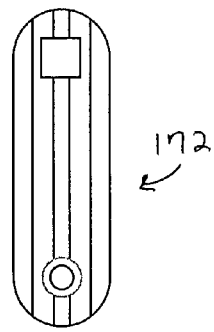
Figure 18F:
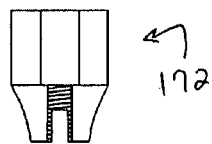
Figure 18G:
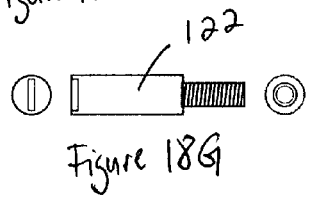
Figure 18H:
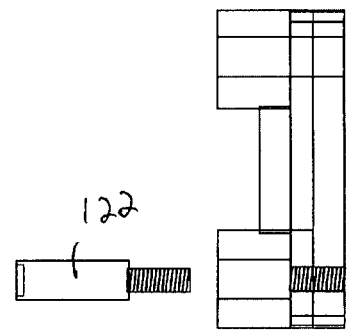

FIGS. 13 and 14 show the guide posts 116 in their storage mode, wherein they are flipped so they extend, generally, in the same "first direction" as the mast, i.e. "upwardly" if the base is placed on a roughly horizontal work piece. These drawings also show, in combination, how the mast 108 can rotate, preferably, a full 90 degrees from vertical (when the frame of the base is horizontal) to horizontal. It is preferred that the housing guide assembly provide this range of adjustment, but those skilled in the art will recognize that alternative guide assemblies falling within the scope of the present invention could have more, or less, adjustability depending on the application, the tool, and other factors as well.

FIG. 14, in particular, shows a side elevational view of the preferred housing guide assembly 104 according to the present invention. The guide posts 116 are shown in their storage mode (extending in the "first direction," i.e. generally in the same direction as the mast, rather than in a "second direction," i.e. generally in the opposite direction, it being understood that even if the mast is angled rather than "straight up," the mast and guide posts are still generally extending in the "first direction").

FIGS. 15 and 25-27, inclusive, show the limit clamp 120 in slidable and adjustable engagement with mast 108. The limit clamp 120 includes a roughly C-shaped body 121 that forms a roughly T-shaped groove in the shape of the mast 108; and forms a threaded hole 129 to accept a locking element 123 consisting of a threaded stud 125 extending from a knob 127 (preferably the same sort of knob used to tighten the mast relative to the base). When the knob 127 is rotated in the tightening direction, the mast is eventually engaged by the inner end of the threaded stud 125, thus locking the limit clamp 120 in place on the mast. The limit clamp 120 is positioned along the mast 108 in such a way that it engages the drill motor housing to limit the depth of the drilled hole (if that is the operation being done). This permits the drilling of multiple holes, each at the prescribed depth. The motor housing is actually engaged by an "angled surface" 131 of the limit stop, which is simply "lower" than the other side of the limit clamp, such that the limit clamp can be used with even shorter bits in the drill chuck.

FIG. 17 show detailed drawings of the mast 108 of the preferred housing guide assembly. These drawings reveals that the thru hole 127 that slidably, but precisely (i.e. with very little slop or wobbling) accepts carriage bolt 126 is preferably square. The carriage bolt 126, the shank portion thereof, is also square, thus making the tightening of the knob 124 on the carriage bolt an easy one-hand operation. A square carriage bolt also maintains a fixed orientation of the locking disks 170, so that their tabs 174 properly align with the mating detents 167 in the brace side pieces 162.

FIG. 18 show detailed drawings of the slide post, or mast, spacers 172. The ribs 184 on the "backs" of the spacers 172 are sized and configured to slip tightly into the sides of the I-beam mast (pref. an I-beam having curved flanges as discussed herein). Note also how the "top" hole in spacer boss 180a is square, to slidably accept the square shank of the carriage bolt 126; and the "bottom" hole is round, and threaded, to threadedly accept one of the bearing bolts 122.

FIG. 19 show how the locking disks 170 have a smooth side 176 and a tabbed side opposite therefrom; and also show the square-shanked carriage bolt 126 that is designed to fit precisely, but slidably, into the curved slots 166 in the brace side pieces 162.

Figures 20A, 20B:
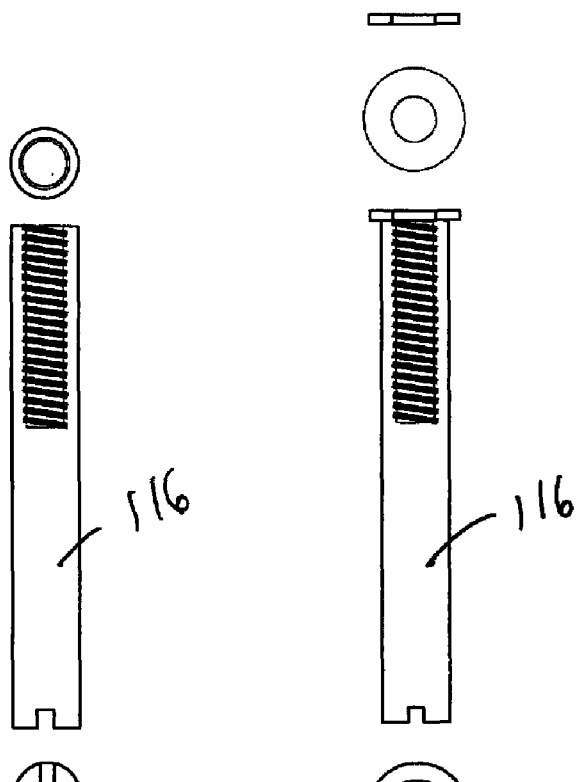
FIGS. 20A-20B show two different versions of the guide post of the housing guide assembly of FIG. 1.
Figures 21A, 21B:
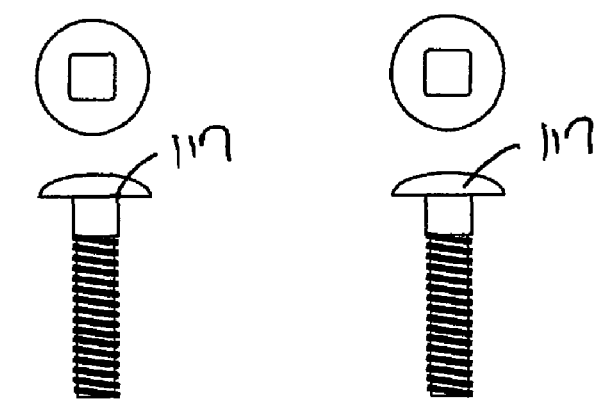
FIGS. 21A-21B show the guide post carriage bolts for the guide posts of FIG. 20.

FIG. 20 illustrate a guide post 116 in detail; and FIG. 21 show the guide post bolts 117 as having a short square shank that is sized to precisely, but slidably, fit into the thru slots 154 in the frame legs 152. The square shank also fits into the diamond-shaped notches 125 located at the precise location in the guide post slots, to accommodate cross-drilling. To engage the guide posts 116 with the notches 125, the guide posts 116 are twisted so that the square shanks of the guide post bolts 117 rotate 45 degrees and fall into the notches 125.

Figure 22A:
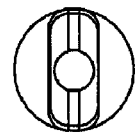
FIGS. 22A-22C show the securing knob of the housing guide assembly of FIG. 1.
Figure 22B:
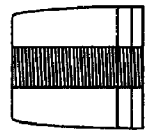
Figure 22C:
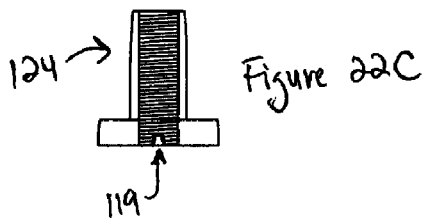

FIG. 22 show the securing knob 124 (which, as noted above, could be used to tighten the mast to the base, but also to tighten the limit clamp to the mast). The knob 124 has a groove 119 in its inner surface (similar to the detents in the brace side pieces) to accept the tab 174 in the locking disk 170, if it is desired to have infinite adjustment of the mast, as opposed to adjustment to one of the pre-set angles.

Basic System Operation

The basic operation of this preferred embodiment of the present invention can now be summarized. FIG. 1 shows a simple square/perpendicular drilling of a hole a predetermined distance 105 from the edge of a work piece 101. This is accomplished first by adjusting the mast 108 at a right angle to the base 106 (most easily by using the locking disks 170 in their indexing position, i.e. with their tabs 174 facing inwardly so as to engage the detents 167 in the side pieces 162 of the brace 160); and then by adjusting the guide posts 116 in their corresponding slots 154 in the frame legs 152. The graduations or marks adjacent the guide post slots 154 can be marked with inch, half inch, quarter inch, etc. gradations so as to quickly adjust the guide posts for a pre-set offset. Then it's simply a matter of grasping the drill motor, engaging the trigger, and slowly lowering the drill motor (given the orientation of FIG. 1) so that the rotating bit engages the work piece 101. As the drill motor is lowered, the operator should maintain lateral pressure on the base 106 so that posts 116 remain in contact with work piece 101, thus ensuring the desired offset 105. Once the drilled hole is sufficiently deep, the drill motor is simply raised to withdraw the bit.

FIG. 3 shows a more complex drilling operation, where not only is a pre-set offset established by suitable adjustment of the guide posts 116 along their respective slots 154; but also a pre-set drilling depth is set using the limit clamp 120; and a 45 degree angled hole is drilled, by virtue of mast-to-base angle adjustment. To quickly adjust the latter, the locking disks 170 are positioned so as to face inwardly, so their tabs 174 can fall into the detents 167 of the brace side pieces 162. This figure also shows how the angled inner surface 131 of the limit clamp 120 engages the drill motor housing 103. Limit clamp 120 is infinitely adjustable along the length of the mast 108 simply by turning the limit clamp knob in the loosening direction to retract the threaded stud 123 out of the body 121, thus loosening the clamp; repositioning the clamp as required; and turning the knob in the tightening direction (typically clockwise) to cause the inner end of the stud 123 to engage the mast flange 110, thus tightening the clamp.

FIGS. 4 and 6 illustrate a cross-drilling operation. They show how variously sized and shaped work pieces can be cross-drilled simply by adjusting the mast 108 to a 45 degree angle, and the guide posts 116 to their unique cross drilling positions as established by the diamond-shaped notches 125 in the guide post slots 154. Then the drill motor assembly 100, so adjusted, is placed on the work piece to be cross drilled, so that the "V" created by the bottom of the base 106 and the posts 116 snugly bear against the work piece. And then the drill motor is activated and lowered (assuming the orientation of FIG. 4) so as to cause the rotating bit to engage the work piece.

Accessories

FIGS. 7-10, inclusive, show a rifling attachment 130 that includes a sub-base 132 that connects to the guide posts 116 (by virtue of the sub-base 132 accepting the guide posts 116 in a pair of spaced vertical (in FIG. 7, for example) guide post holes); a U-bolt 134 that extends through a pair of spaced horizontal (in FIG. 7) holes in the sub-base 132; and a pair of wing nuts 136 that, when tightened, cause the U-bolt 134 to pull the work piece 101 toward a vertical (in FIG. 7) V-slot 138 (see FIGS. 8 and 9) in the sub-base 132. Thus the guide posts 116 in the preferred embodiment fulfill multiple purposes: edge guides, to create a precise, repeatable offset from the edge of a work piece; cross-drilling guides, to facilitate cross-drilling of a tube, rod, etc.; and attachment points for the rifling attachment 130.

Figure 28A:
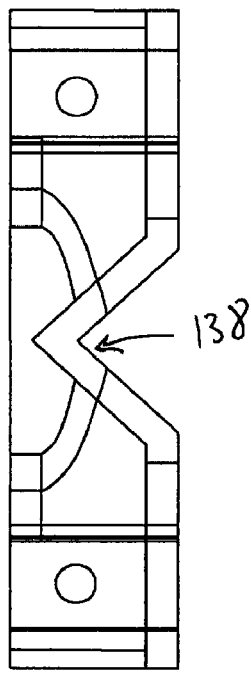
FIGS. 28A-28C are various orthogonal views of the sub-base of the rifling attachment of FIGS. 7-10, inclusive.
Figure 28B:
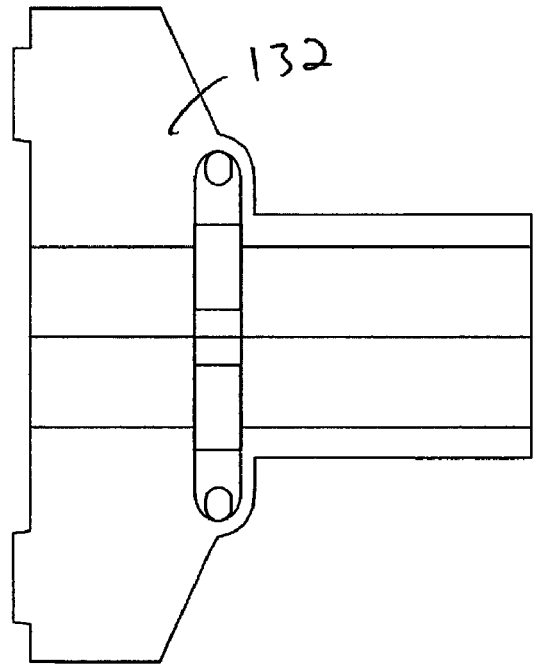
Figure 28C:
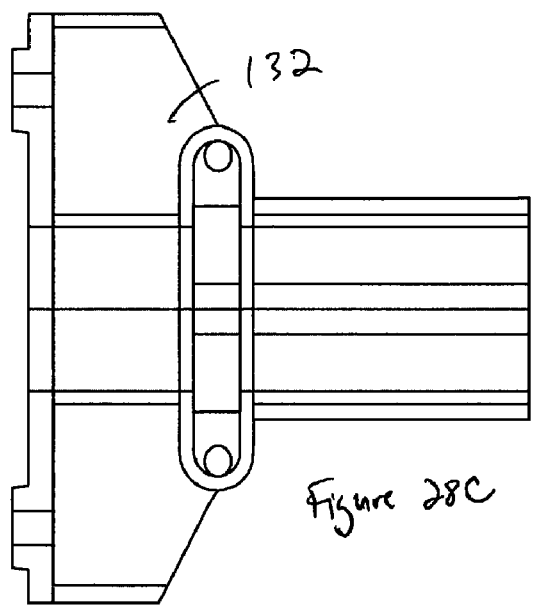

FIG. 28 show additional detail of the rifling accessory, particularly the rifling sub-base 132. It should be noted that the "V-groove" 138 in the rifling sub-base could easily be a different angle, not necessarily 90 degrees, particularly if it is desired to rifle larger work pieces in particular. If the angle is too small, relative to the size of the work piece, then the work piece won't be adequately braced for precise rifling.

Figure 9:
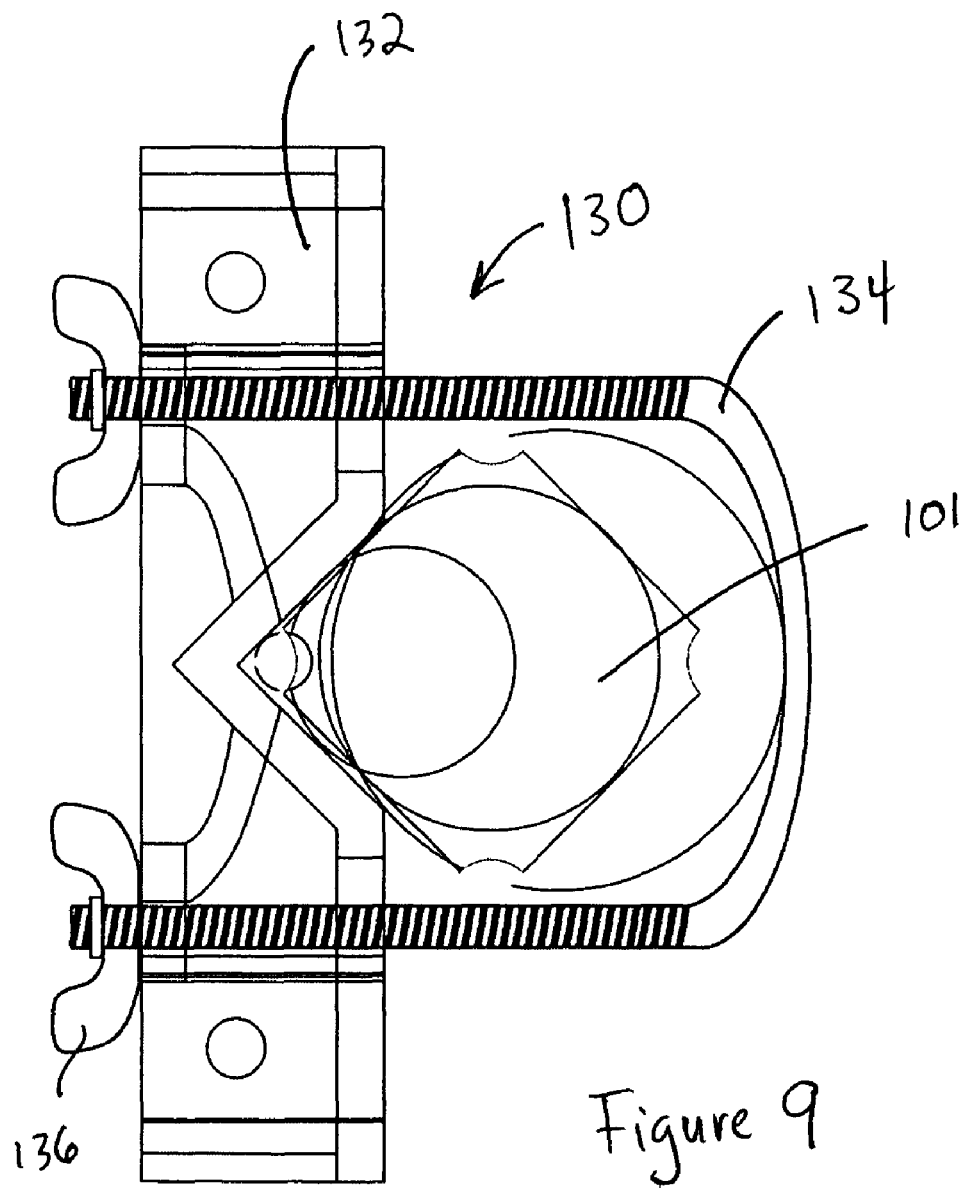
FIG. 9 is a bottom plan view of the rifling attachment shown in FIGS. 7 and 8, illustrating how variously sized and shaped work pieces can be rifled.
Figure 10:
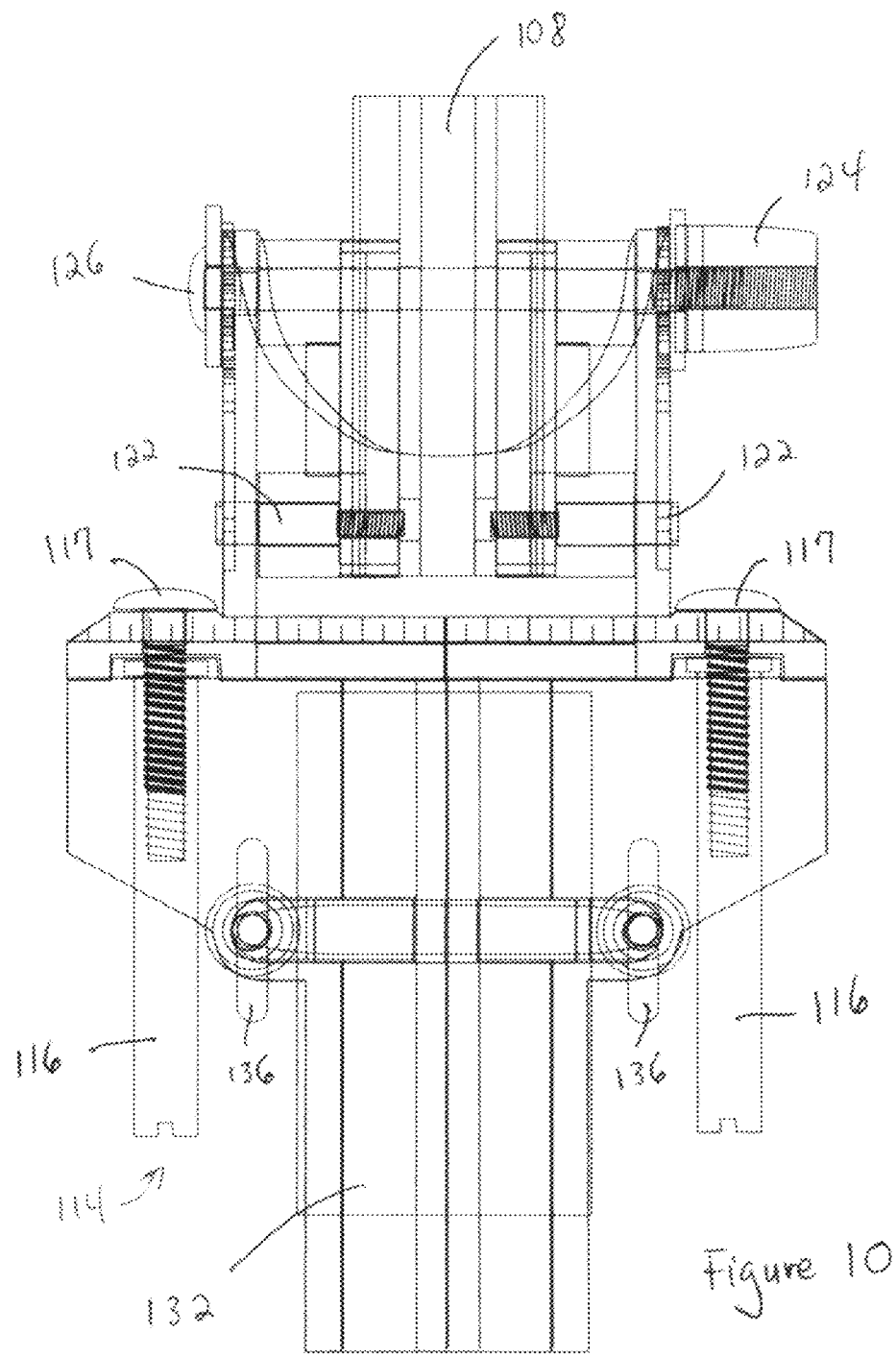
FIG. 10 is an end elevational view of the drill motor assembly of FIG. 7, with the rifling attachment installed.

FIG. 9, for example, shows the rifling accessory in use. This drawing depicts how the U-bolt 134 draws the work piece toward the V-groove 138 in the rifling accessory sub-base 132, as the wing nuts 136 are tightened. Very small stock can be rifled, all the way up to larger stock in various cross-sectional shapes.

FIGS. 29 and 30 show the preferred rifling accessory U-bolt 134 and wing nuts 136.

Figure 31:
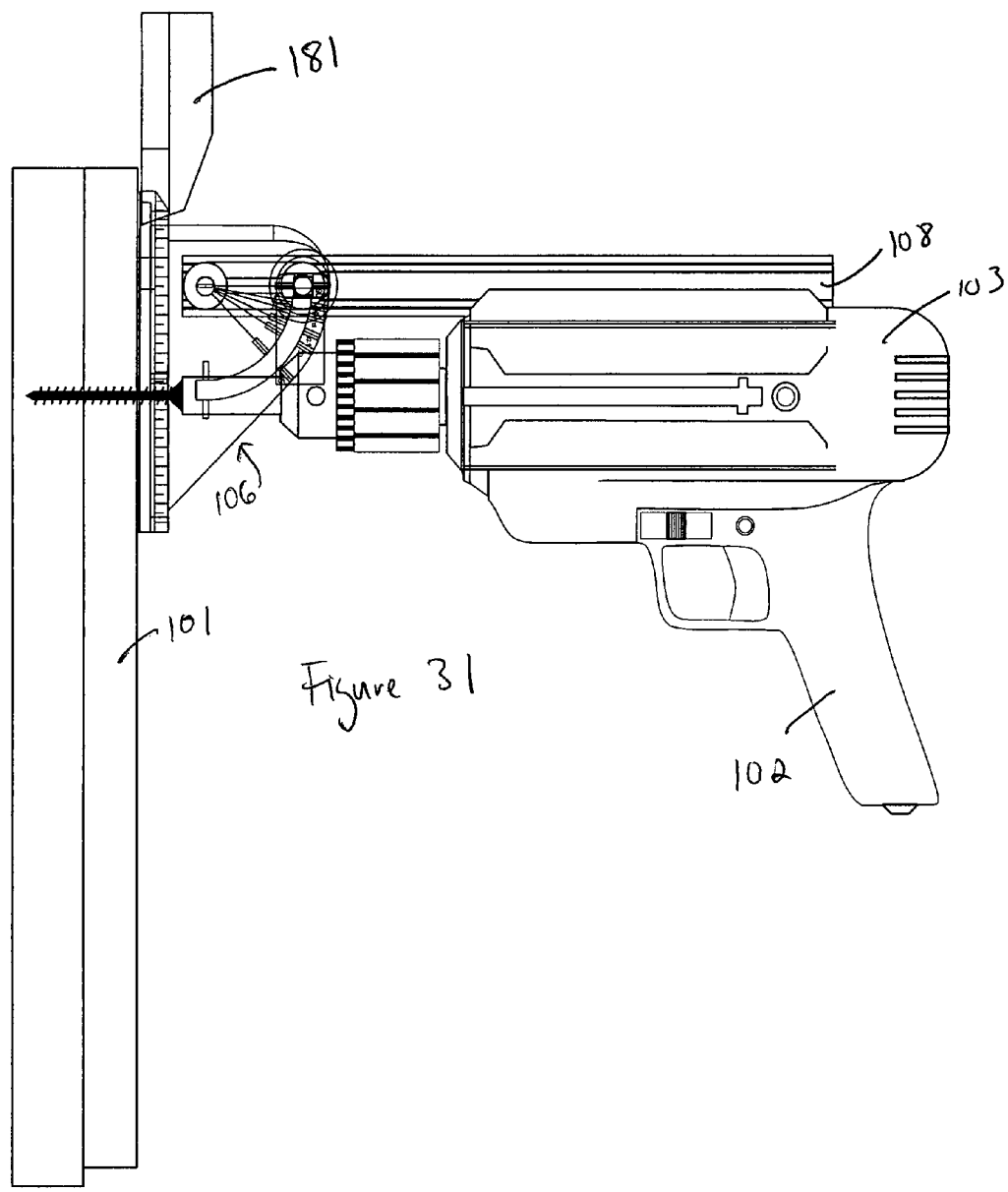
FIG. 31 shows the drill motor assembly of FIG. 1, attached to the base of which is a stud sensor, being used to drill a "horizontal" hole in a work piece.
Figures 32A, 32B, 32C:
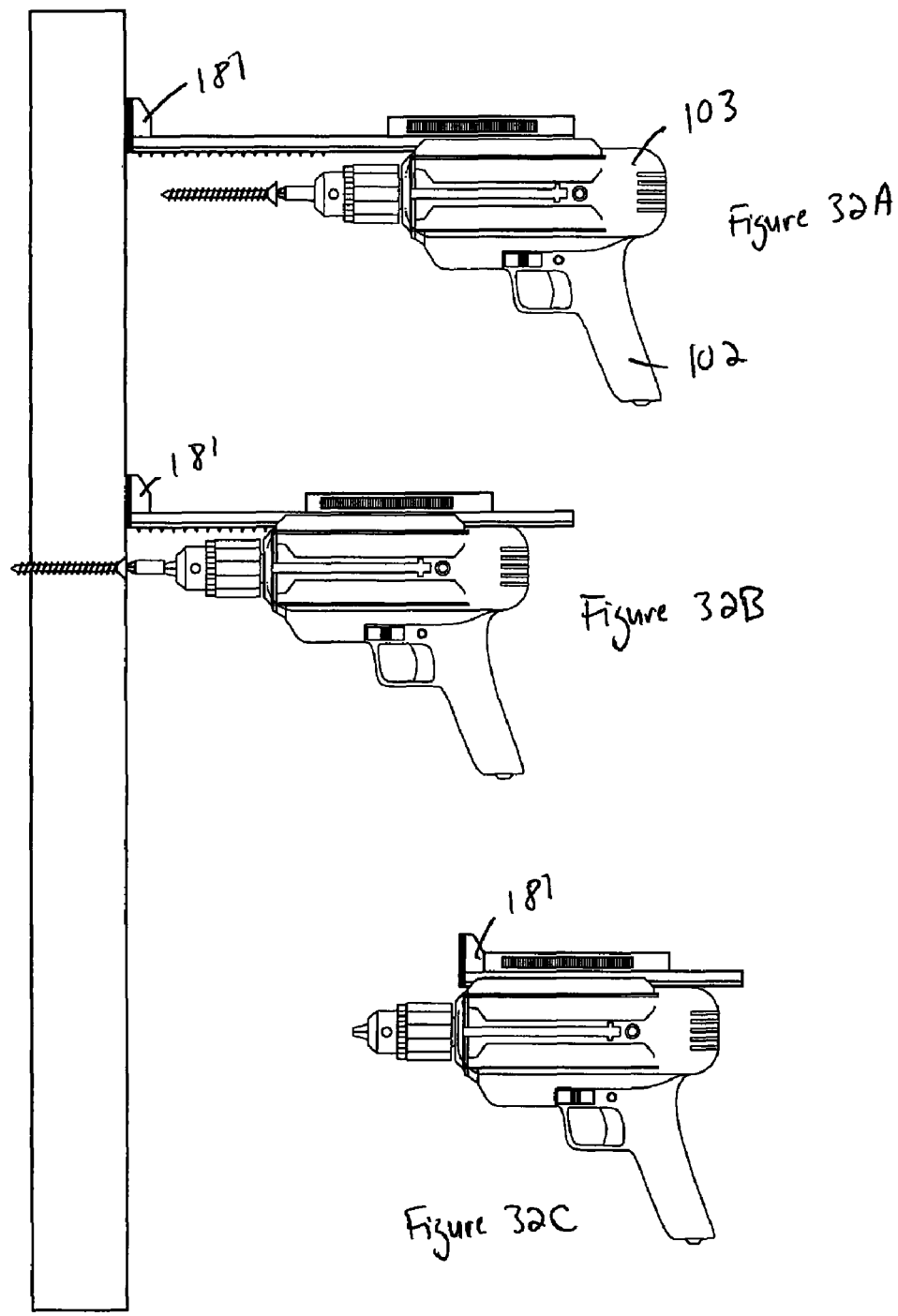
FIGS. 32A-32C show the drill motor assembly of FIG. 1, attached to which is a spring-loaded stud sensor.
Figure 38A:
FIGS. 38A-38C show a spring-loaded stud sensor attached to the drill motor of FIG. 1.
Figure 38B:
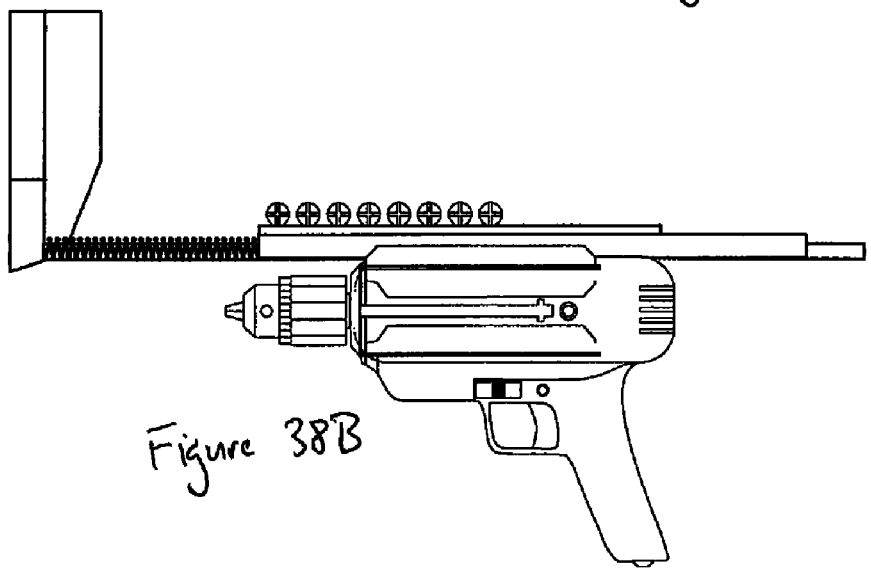
Figure 38C:
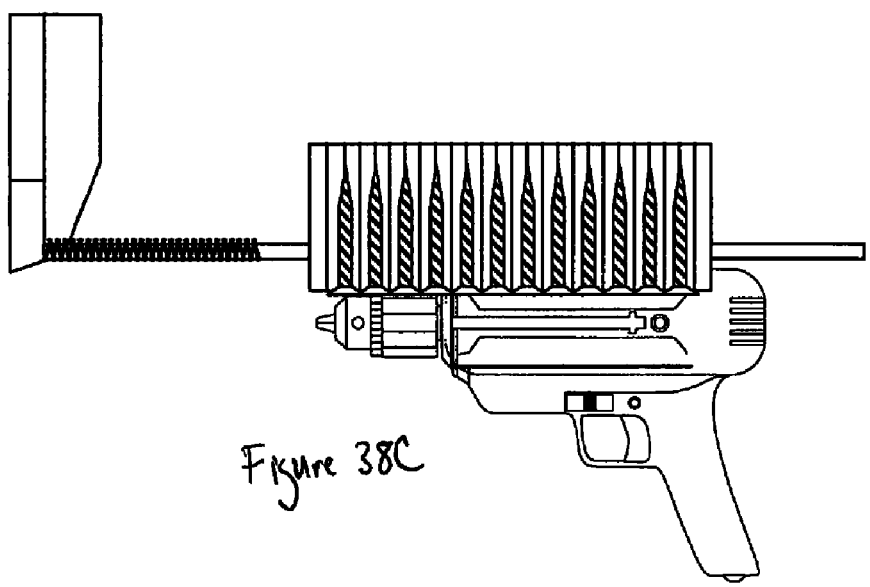
Figure 39:
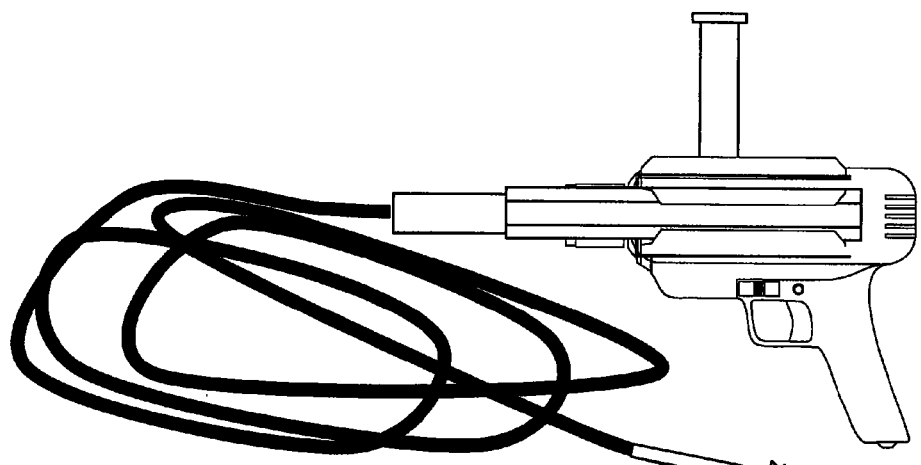
FIG. 39 shows a powered drain snake and auxiliary handle attached to the drill motor of FIG. 1.
Figure 40:
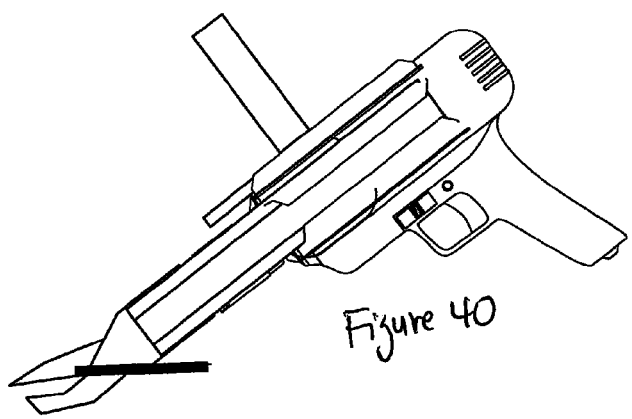
FIG. 40 shows a powered nipper and auxiliary handle attached to the drill motor of FIG. 1.
Figure 41:
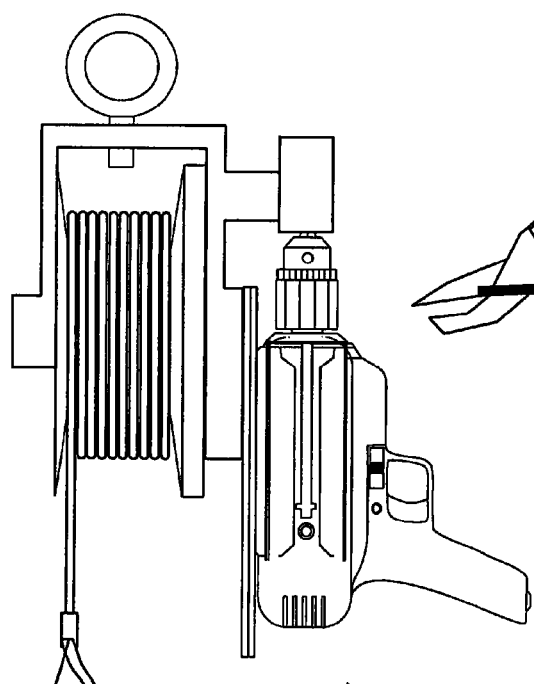
FIG. 41 shows a powered winch attached to the drill motor of FIG. 1.
Figure 60A:
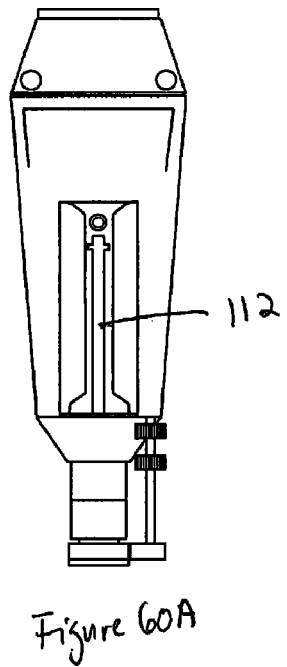
FIG. 60A-60C show orthogonal views of a nail gun equipped with a housing slide according to the present invention, for accepting various attachments and accommodating storage.
Figure 60B:
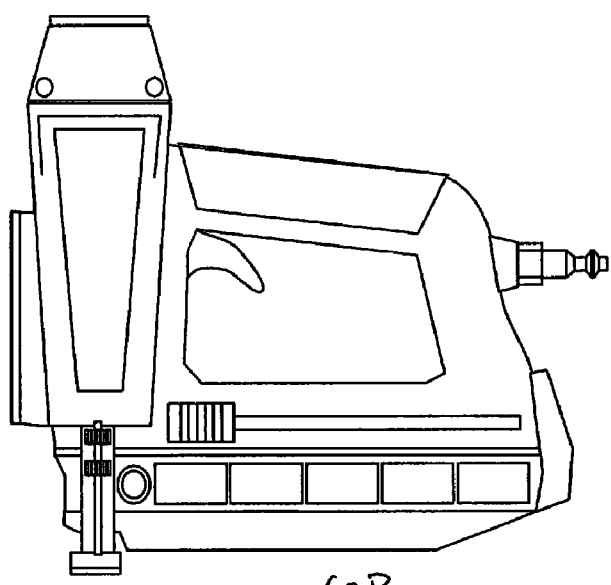
Figure 60C:
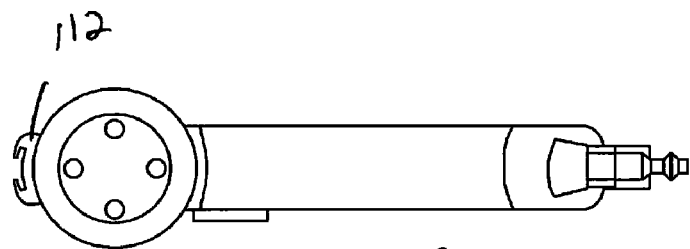
Figure 61A:
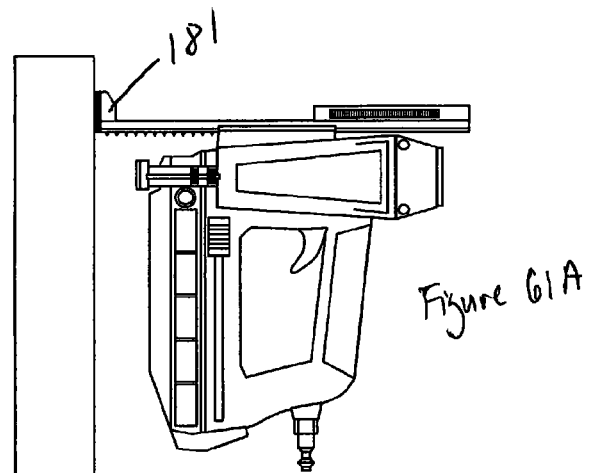
FIGS. 61A-61C show the nail gun of FIG. 60, equipped with a spring-loaded stud finder.
Figure 61B:
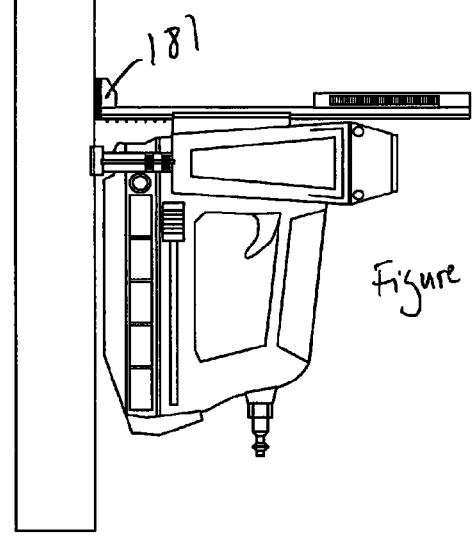
Figure 61C:
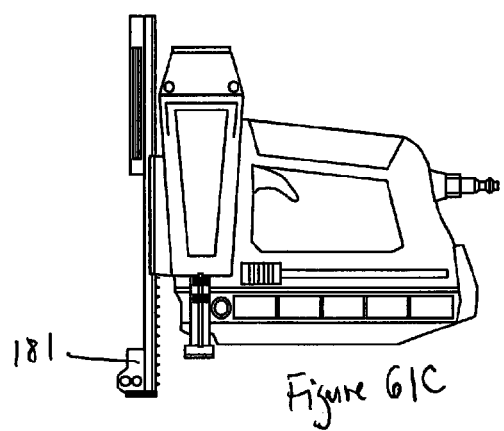

FIGS. 31, 32 and 38 show that the housing guide assembly could carry, preferably in a removable manner, a stud sensor. And, as shown, the mast could be rotated relative to the base so that it is perpendicular to the bottom of the base and wall, when the base is placed flush against the wall. When so outfitted and positioned, the drill motor assembly (i.e. the housing guide assembly and the drill motor, in combination) could quickly and easily locate studs (beneath drywall, etc.) and drill perfectly perpendicular holes therein. FIG. 31 shows the use of a stud finder 181 removably attached to the base 106 and aligned with the mast 108. The stud finder 181, in this drawing, is attached to the top edge of the base. This attachment could be achieved in any number of ways, e.g., threaded fasteners. As shown in FIG. 32, a "spring-loaded mechanism" could be used to elastically bias the drill toward its fully retracted ("raised", if drilling vertically downwardly; to the right in FIG. 32) position. That way, the user can, with one hand, drill hole after hole at the preferred angle, into a stud. Or, even more advantageously, one-handedly drive screw after screw into drywall. This latter application would normally be done by a screw gun, it being understood throughout this document that a "drill" refers, unless the context clearly indicates otherwise, not only to a portable electric drill of the normal variety used to drill holes, but also to screw guns, electric screwdrivers, "Dremel" type tools, and the like. In fact, if the invention were applied to a nail gun 183 as shown in FIGS. 60 and 61, a stud sensor 181 could be readily attached to the nail gun to facilitate rapid and precise nailing of various boards, wallboard, paneling, etc., to buried studs.

Figure 43:
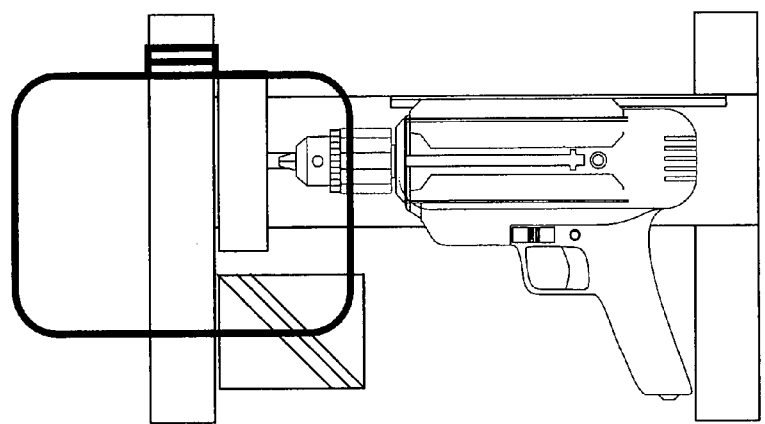
FIG. 43 shows a grinder attachment connected to the drill motor of FIG. 1.
Figure 44:
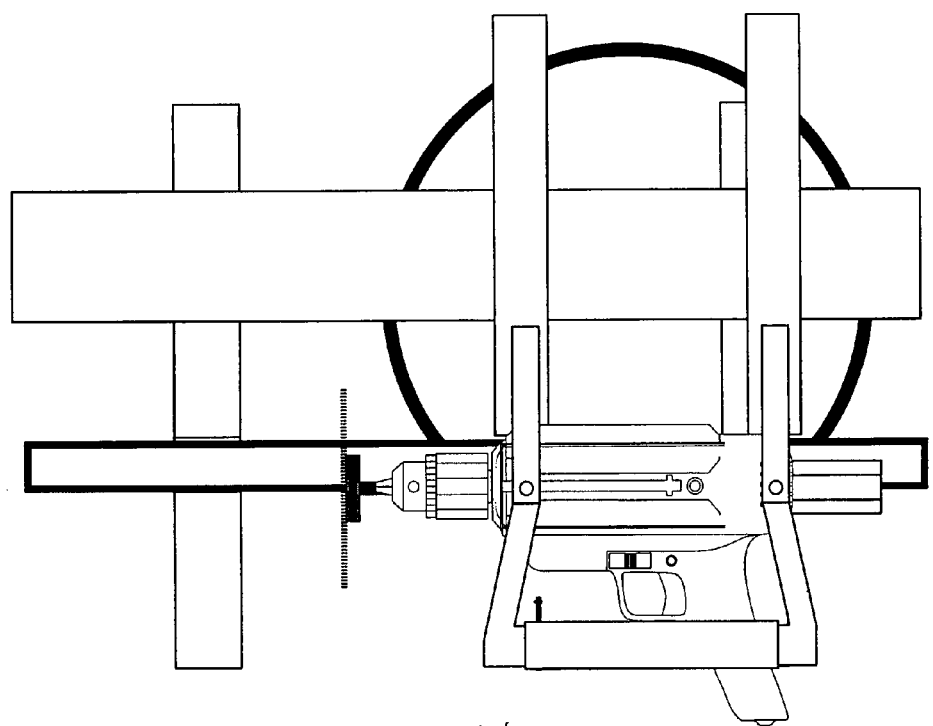
FIG. 44 shows a cutoff saw attachment connected to the drill motor of FIG. 1.
Figure 48:
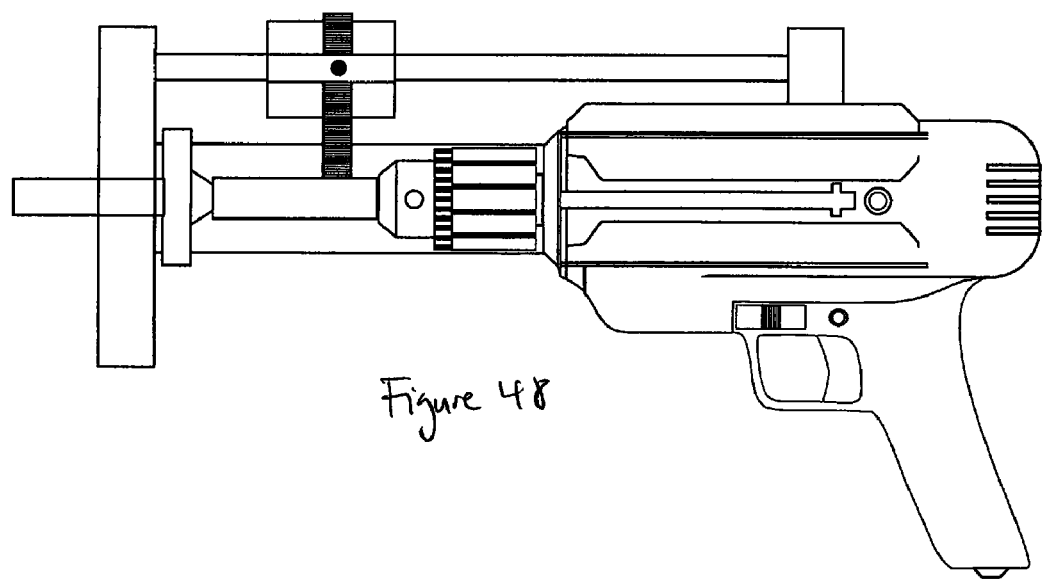
FIG. 48 shows a lathe attachment connected to and powered by the drill motor of FIG. 1.
Figure 49:
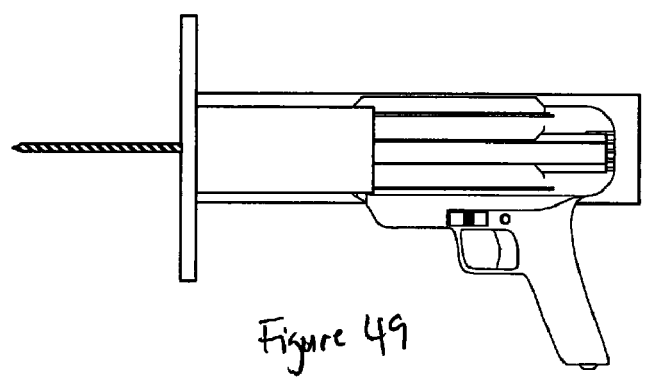
FIG. 49 shows a "Roto-Zip" attachment connected to and powered by the drill motor of FIG. 1.

FIGS. 43 and 48 show how a light-duty lathe or grinder could be coupled to a drill motor 102 having housing slides 112 according to the present invention. If the drill motor is decoupled from the drill guide, the result is a drill motor that can be comfortably used like a normal, portable, freehand drill. But in addition, the drill motor can be connected to any number of attachments. All that is required is that the attachment include an attachment point (i.e. the male slide 110 on the mast 108) having the size and shape of the mast 108, or at least half of the mast 108. Attachments can include lights, stud sensors, bit/fastener holders, and, as shown in FIGS. 43 and 48, for example, bigger attachments that use the drill motor to power an operation other than drilling.

Figure 35:
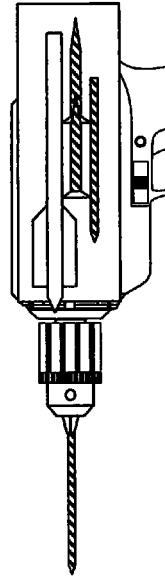
Figure 37:
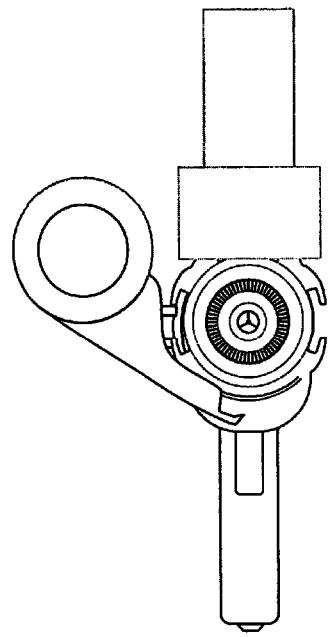
FIG. 37 is an end elevational view of the drill motor of FIG. 1 attached to which is a screw feeding device.
Figure 36:
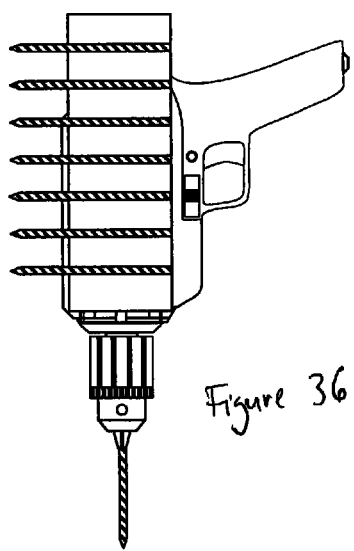

FIGS. 35 and 36 shows how an accessory could be readily attached to the drill motor housing 103, to carry bits and possibly screws and nuts as well. The device could even be magnetic. Again, all that is required is that the attachment carry a substantially T-shaped "male slide" having the same cross-sectional shape as the mast slide 110. Depending on the precise fit and the loads, it might also be desirable for the accessory to include a locking device of some sort, so that the accessory can be locked to the motor housing after being fully slid into engagement therewith.

FIGS. 42 and 43, respectively, show two more potential accessories, a 90 degree adapter and a light-duty grinder. Again, all of these accessories, and more, are facilitated by the fact that the drill motor housing forms one or more T-grooves 112 that normally accept the drill guide mast 108, but can also form convenient attachment points for a wide variety of attachments.

Figure 45A:
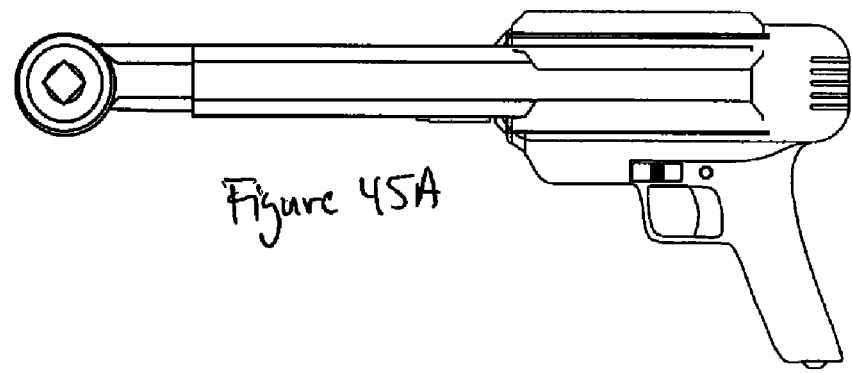
FIGS. 45A-45B show two views of a powered ratchet attachment connected to and powered by the drill motor of FIG. 1.
Figure 45B:
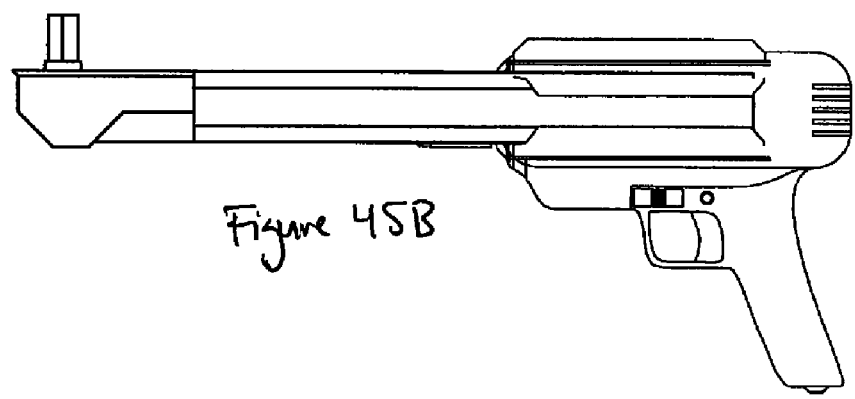
Figure 53:
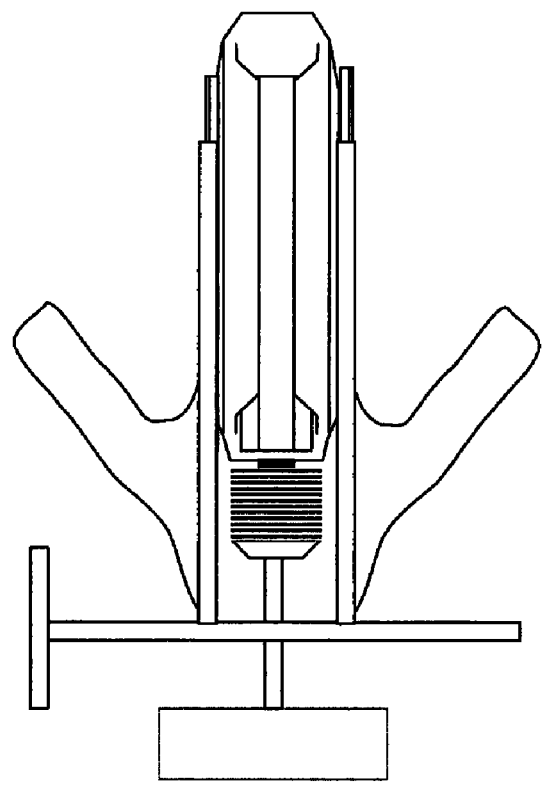
FIG. 53 shows a two-handled attachment for drilling centered holes in pipes, for use with the drill motor of FIG. 1.
Figure 54:
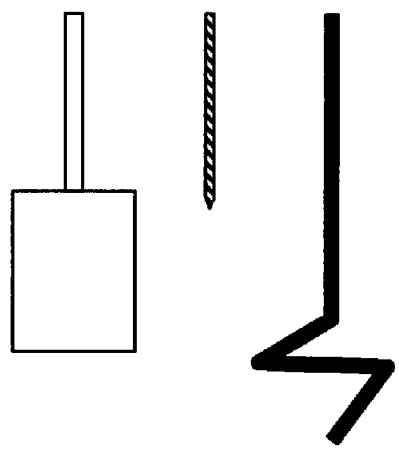
FIG. 54 shows various tools for use with the drill motor of FIG. 1.

FIG. 47 show an auxiliary handle; FIG. 45, a powered ratchet wrench; and FIG. 53, a combination handle/V-notch device that creates a simple way to cross drill pipes and the like.

FIG. 38 illustrate still another accessory, a combination stud sensor/magnetic screw holder. Alternatively, an adhesive strip could hold the screws. This device preferably includes a spring to bias the drill motor away from the stud sensor, to facilitate one-hand screw gun operation.

Figures 52A, 52B:
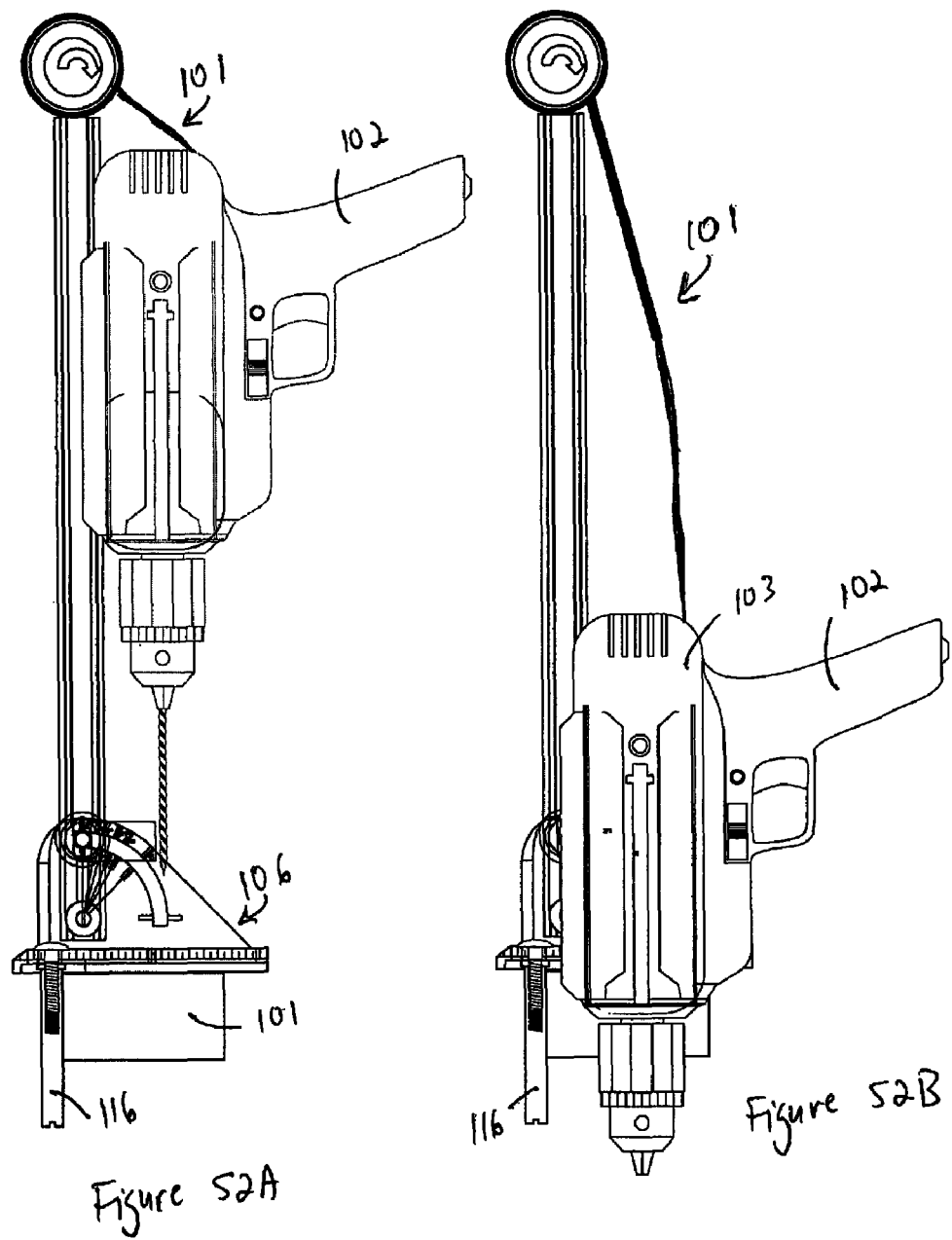
FIGS. 52A-52B illustrate a drill motor assembly of the present invention supplied with a spring retractor.

The versatility of the system of the present invention is further illustrated in FIG. 52. This embodiment of the system includes an extension spring 101 that helps return the drill motor to its upper (in the drawing) position. Again, the spring 101 makes one-hand operation easier. A compression spring (not shown) could also be used, located between the base (or the bottom of the mast) and the drill motor.

Figure 33A:
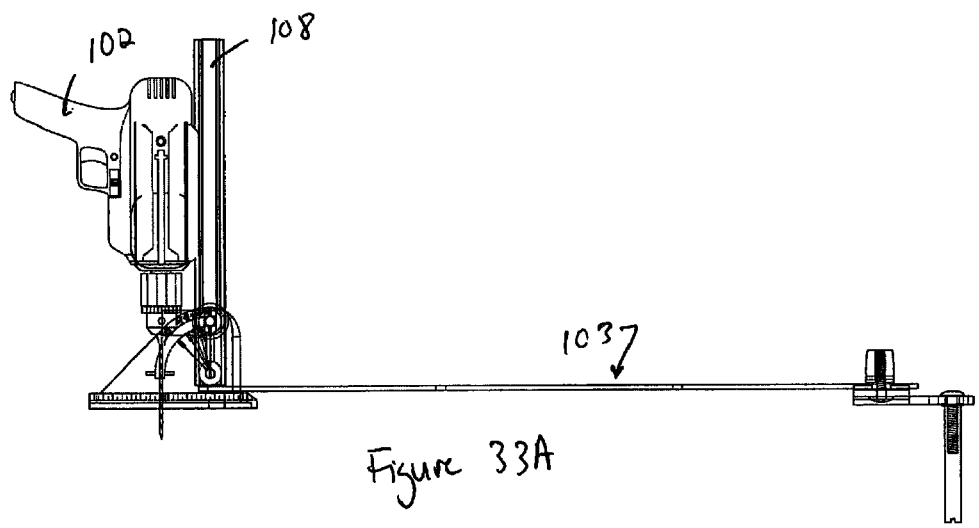
FIGS. 33A-33B show a frame extender attached to the drill motor assembly of FIG. 1.
Figure 33B:
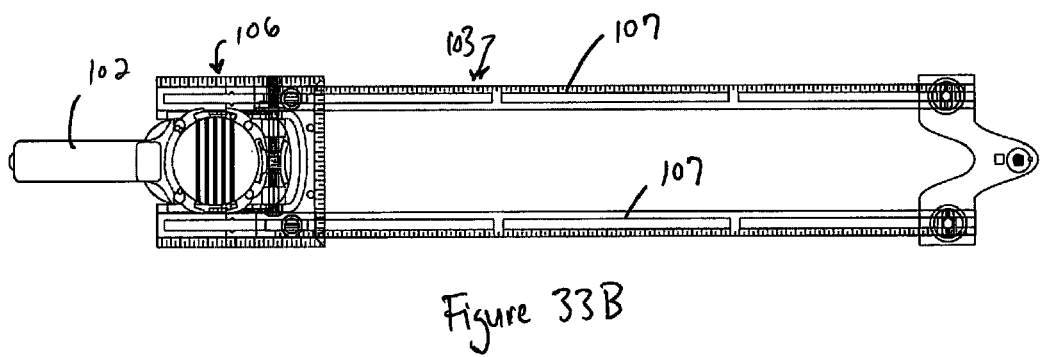
Figure 34A:
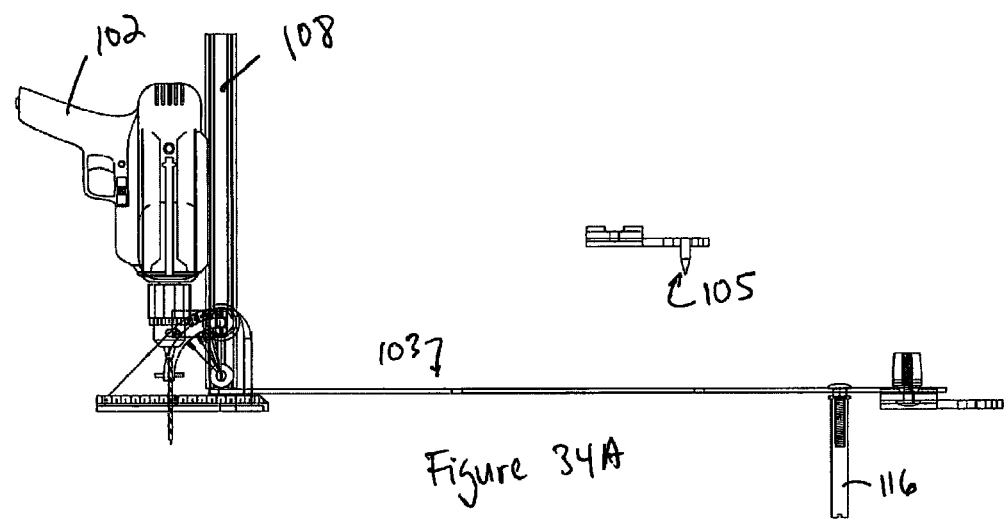
FIGS. 34A-34B also show a frame extender attached to the drill motor assembly of FIG. 1.
Figure 34B:
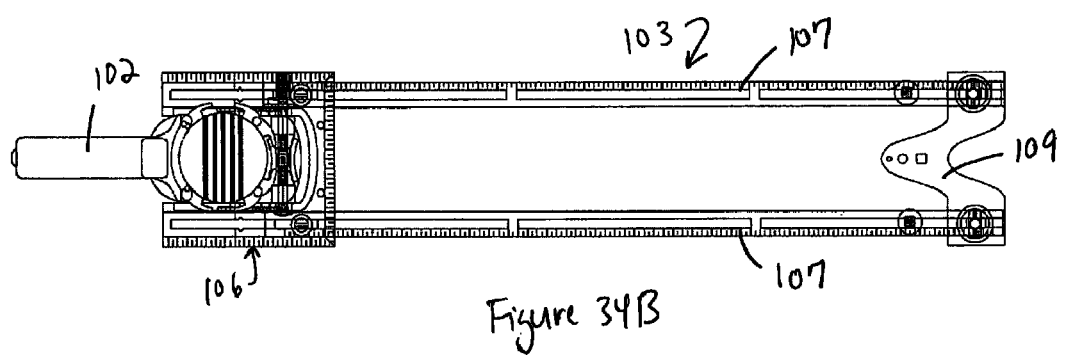

FIGS. 33 and 34 shows a frame extender attachment 103, to effectively extend the length of the guide post slots. Such an attachment permits edge offset drilling at considerable distances; and also permits accurate drilling of multiple holes around a circle, when a single point stylist 105 (the pivot point) is used in lieu of guide posts. This attachment includes a pair of long slotted "frame extenders" 107 that preferably attach to the top surface of the frame. An A-shaped end piece 109 attaches to the frame extenders in two different orientations, with the peak of the "A" extending outwardly or inwardly.

Figures 42A, 42B, 42C, 42D:
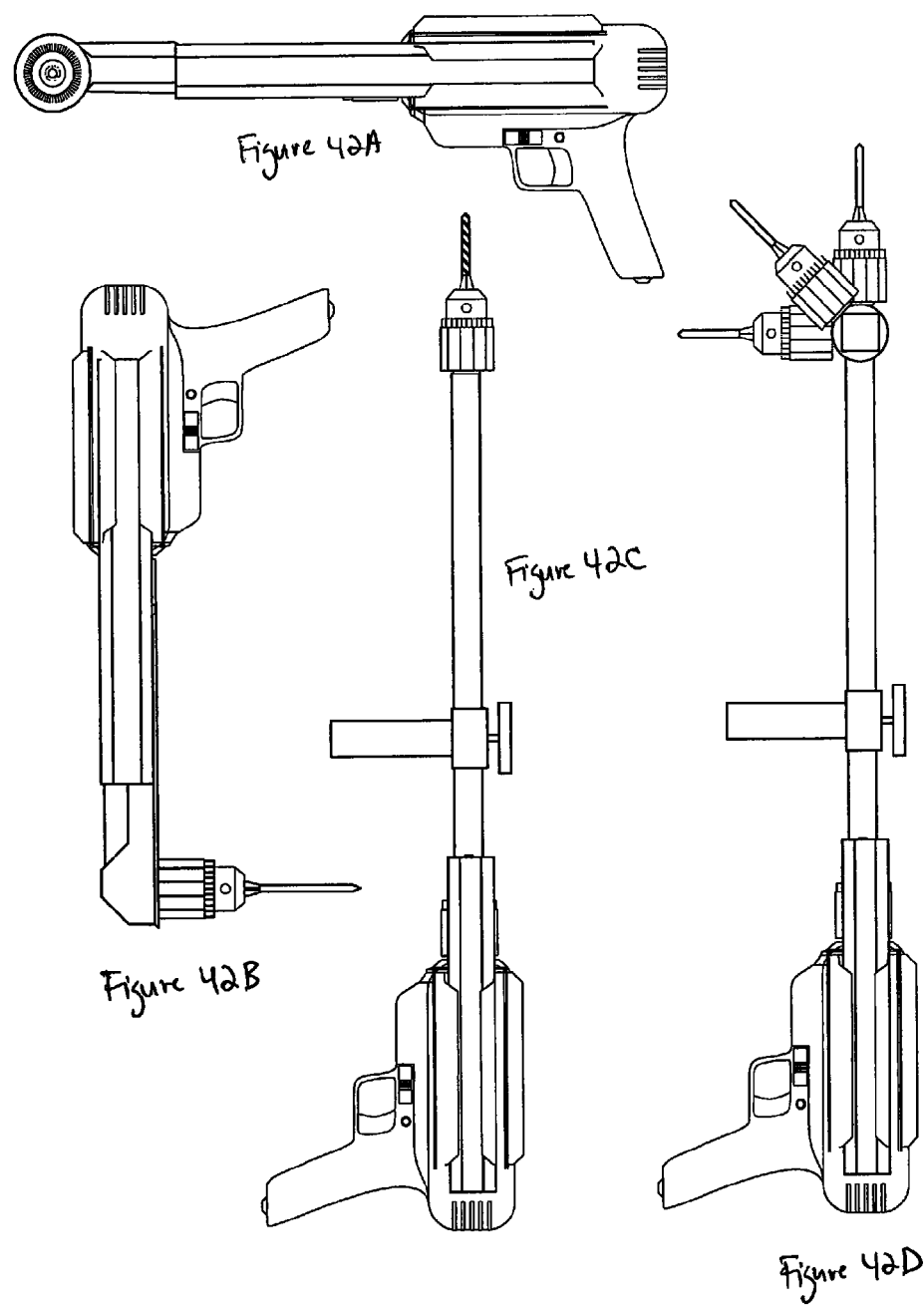
FIGS. 42A-42D show various views and embodiments of drill extenders and adapters attached to the drill motor of FIG. 1.

FIGS. 42C and 42D show still another accessory, a drill extender.

Figure 46:
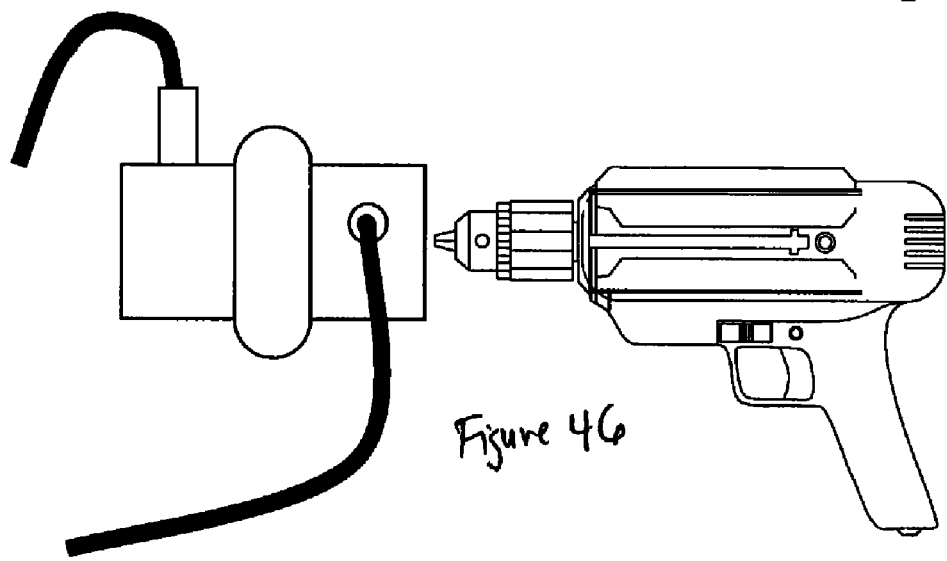
FIG. 46 shows a pump attachment connected to and powered by the drill motor of FIG. 1.
Figure 47A:
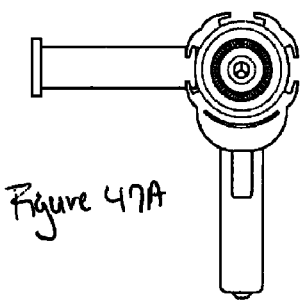
FIGS. 47A-47E show a handle attachment connected to the drill motor of FIG. 1.
Figure 47B:
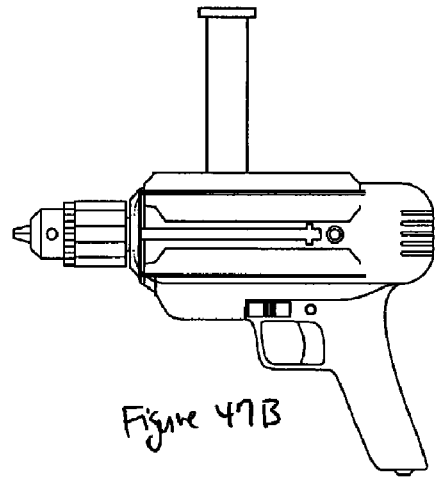
Figure 47C:
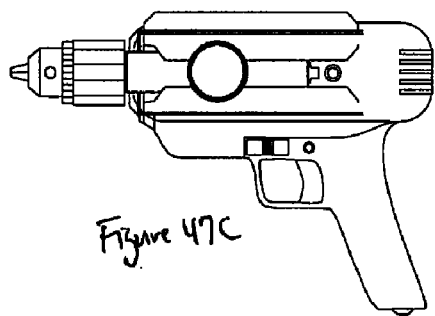
Figure 47D:
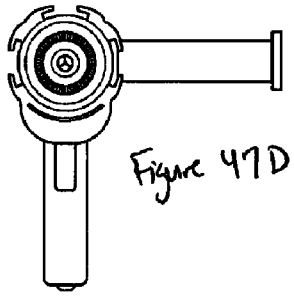
Figure 47E:
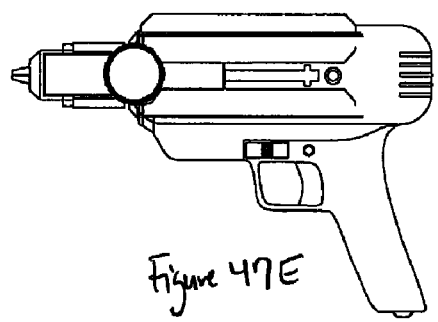
Figure 50:
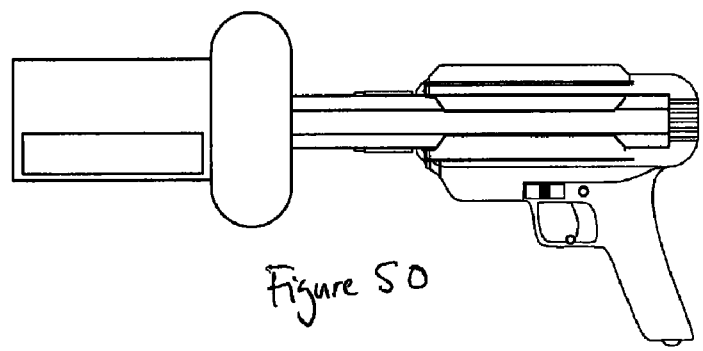
FIG. 50 shows a fan attachment connected to and powered by the drill motor of FIG. 1.
Figure 51:
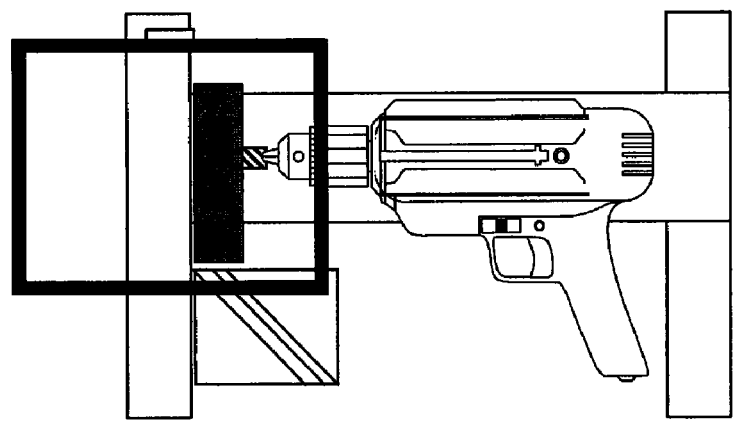
FIG. 51 shows a grinder attachment connected to and powered by the drill motor of FIG. 1.

FIGS. 46 and 50, respectively, illustrate two more attachments, namely a pump and a fan.

Again, the myriad of accessories is possible because of the "housing slides" 112 in the tool motor housing 103. Other accessories will be apparent to those skilled in art.

Storage Solutions

The housing slides 112 in the motor housing 103 permit the drill motor 102 (or other tool motor, if the principles of the present invention are applied to a tool other than a "drill") to be conveniently stored wherever a corresponding, or mating, "male" slide can be located. Importantly, not only can the tool motor be conveniently stored (and charged, as discussed below), but various attachments can be conveniently stored as well, wherever a "female" slide can be located. And, again, those skilled in the art will recognize that the tool motor could just as easily carry the male slide, in which case the "genders" of the slides and the storage devices, brackets, etc., would switch.

FIGS. 56 and 57 illustrate how the motor housing slides 112 can accept not only the mast of the housing guide assembly, but also a storage bracket 115 that can be screwed to a wall, workbench, etc., having a bracket base 117 and a curved (in cross section) flange 119 (in effect half of a mast), with the base having holes 121 to facilitate mounting.

Figure 58:
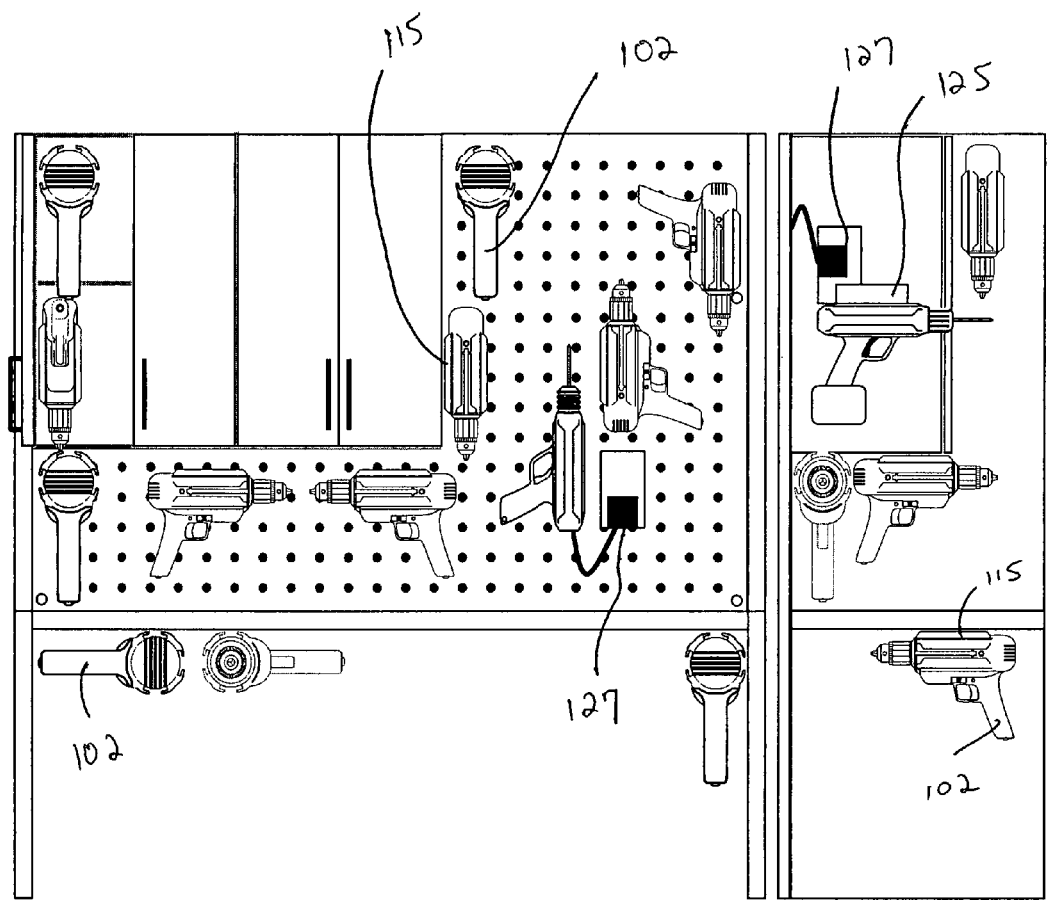
FIG. 58 illustrates many exemplary ways a tool motor according to the present invention can be stored using the storage bracket of FIGS. 56, and a modified storage bracket having charging contacts.
Figure 59:
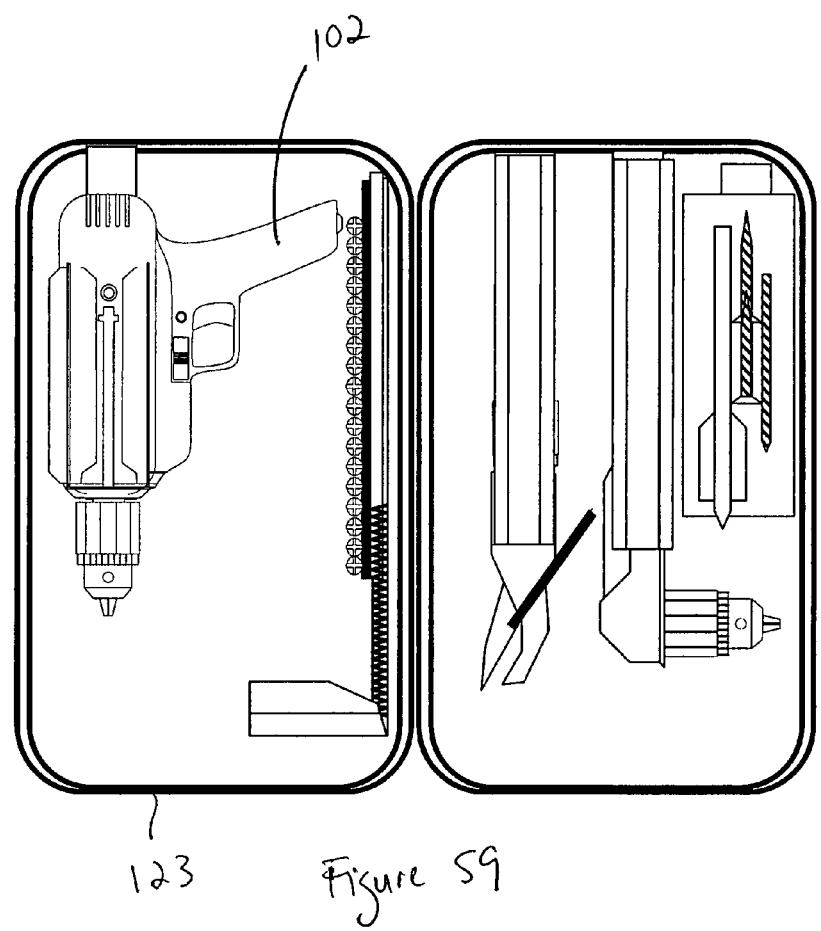
FIG. 59 shows a storage case for a preferred tool motor and accessories according to the present invention.

FIG. 58 shows how the drill can be stored in many different places and orientations, simply by mounting the bracket 115 shown in FIGS. 56 and 57 in various ways, on a work bench, under a work bench, on a cabinet, in a cabinet, or even in a case 123 (see FIG. 59), and even adjacent an electrical outlet, to permit the drill to be recharged after being attached to its bracket. In fact, if the drill was configured to have a pair of recharging contacts on or in the drill motor housing, and the storage bracket had a corresponding pair of contacts on its "half-mast" flange, then when the drill is fully slid onto its bracket the corresponding pairs of contacts could be sized and configured to automatically come into electrical contact to charge the drill once it is fully seated on its storage bracket. This is shown in FIG. 58, in particular the "hot" storage bracket 125 and the charger 127 plugged into a 115 VAC outlet.

Figure 55A:
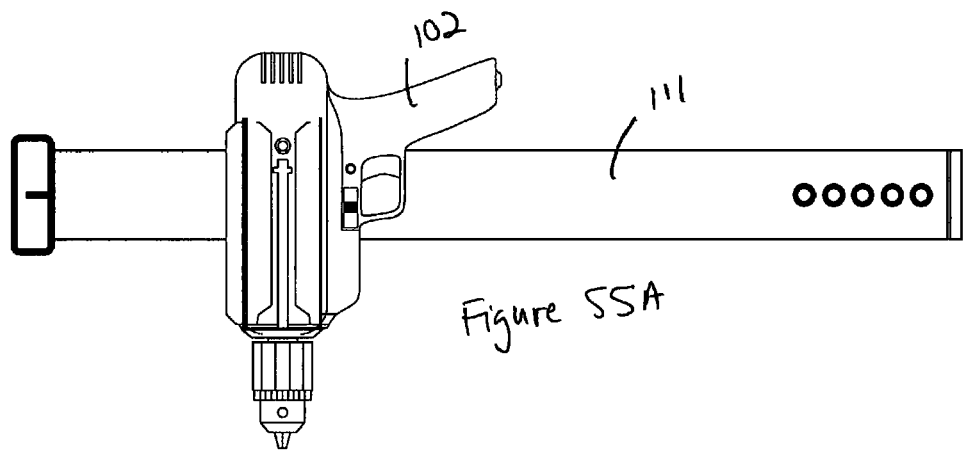
FIGS. 55A-55B show two views of a work belt storage option for the drill motor of FIG. 1.
Figure 55B:
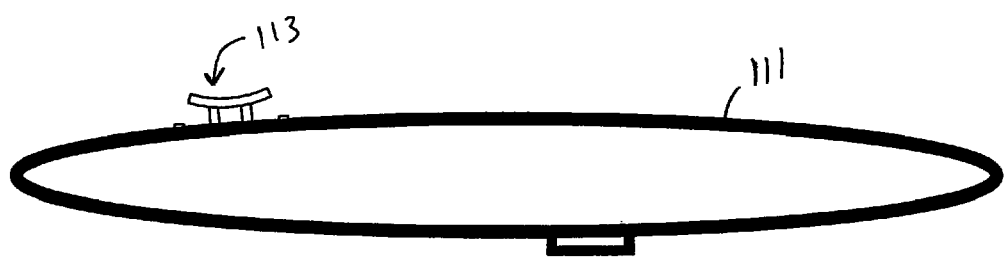

FIG. 55 show how the motor housing slide 112 even allows the drill motor 102 to be attached to a belt 111 worn by an operator, the belt having, in effect, a short one-half mast section 113 extending outwardly from it.

Alternative Embodiments

It should be noted that this section, even though titled "Alternative Embodiments," is not intended to list all alternative embodiments that one skilled in the art would recognize as being within the scope of the present invention. Rather, the alternative embodiments discussed below are but a few examples, in addition to those discussed above, of what could be altered or added in connection with the present invention and still fall within the scope thereof.

FIG. 62 shows alternative slot/groove type configurations, to create the sliding engagement between the mast and the drill motor housing. Of particular note is the fact that the present invention contemplates a variety of slide systems, including a slide system where the "male" portion of the slide is attached to the drill motor housing; and the "female" portion of the slide is formed by the mast.

Figure 63:
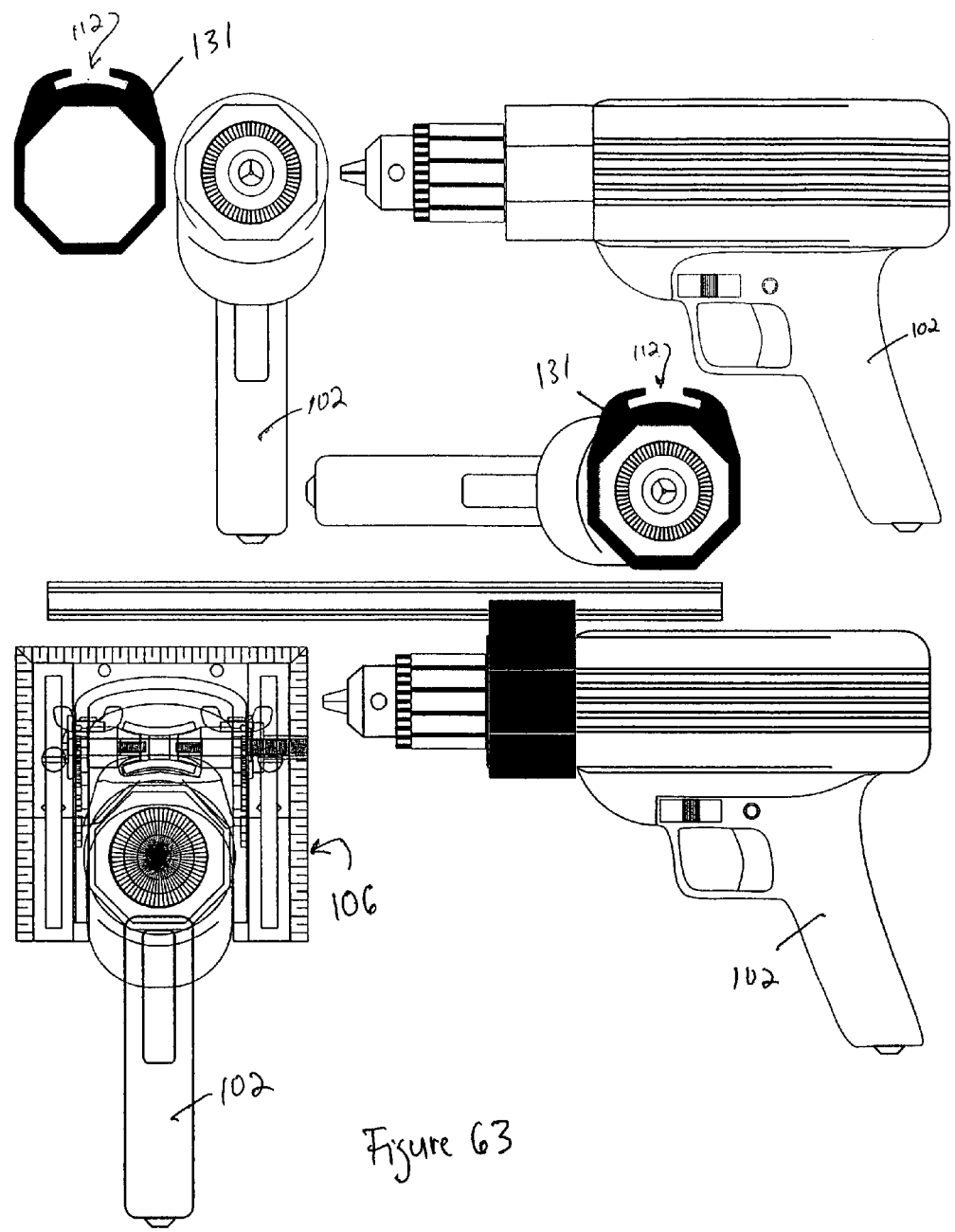
FIG. 63 illustrates an adapter bracket that can be attached to a tool housing having a complementary cross-sectional shape, and how the adapted tool can be cooperatively coupled to the mast of a housing guide assembly according to the present invention.
Figure 66:
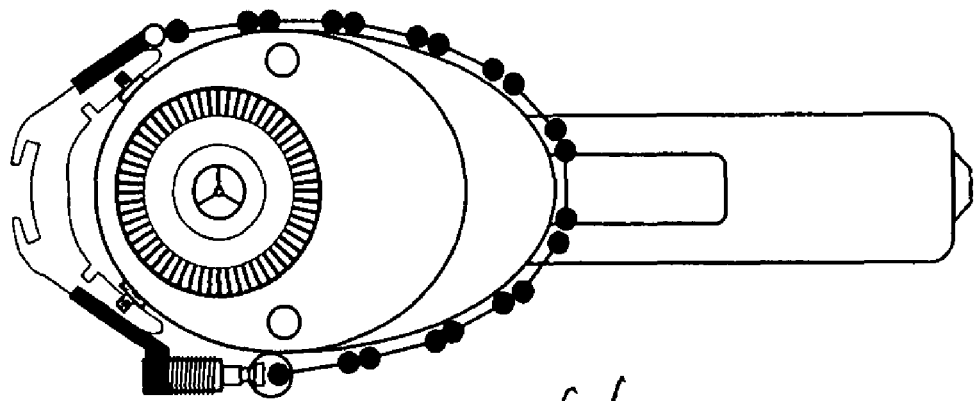
FIG. 66 shows an end view of the adapter bracket of FIG. 65 attached to a drill motor housing.
Figure 65:
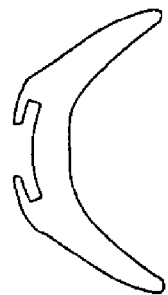
FIG. 65 shows an end view of an adapter bracket suitable for connecting to a tool motor housing according to the present invention.

FIG. 63 illustrates an alternative way to create the slide portion on the drill motor housing. In this design, an adapter sleeve 131 having a "female" T-shaped groove can be attached to the front (toward the chuck) of the drill motor housing. This groove can engage the "male" flange (curved in this case) of a mast. Note that the adapter sleeve can preferably attach to the drill motor housing in such a way that the groove faces toward either side or the top.

FIG. 64 depicts a simplified alternative embodiment of the housing guide assembly, wherein the mast is a simple post 133 that is non-adjustably secured to a base 135 that forms a "V" in its bottom surface for cross drilling purposes.

Other advantages to the present invention will also be apparent to the reader over the prior art. Moreover, the specific embodiments disclosed herein are not intended to be limiting of the invention but only exemplary.

The invention claimed is:

1. A tool motor assembly for processing a work piece, the tool motor assembly comprising:
   A. a tool motor; and
   B. a guide assembly comprising (1) a base; (2) a mast pivotably connected to the base at a mast attachment point and extending from the base generally in a first direction, wherein the mast slidably supports the tool motor such that it can smoothly and precisely move along the length of the mast; and (3) a post assembly adjustably connected to the base and extending from the base in a second direction generally opposite from the first direction, wherein the post assembly fixedly attaches to the base a preset distance from the mast attachment point for a first type of work piece processing, and adjustably attaches to the base a variable distance from the mast attachment point for a second type of work piece processing, wherein (i) the post assembly comprises a pair of laterally-spaced posts, (ii) the fixed connection to the base is accomplished by virtue of the base forming a pair of notches for non-adjustably accepting the posts, and (iii) the adjustable connection to the base is accomplished by virtue of the base forming a pair of parallel post slots for adjustably accepting the posts.

\* \* \* \* \*